United States Patent

Kobashi et al.

(10) Patent No.: US 8,645,030 B2
(45) Date of Patent: Feb. 4, 2014

(54) CONTROL DEVICE OF INVERTED PENDULUM TYPE VEHICLE

(75) Inventors: Shinichiro Kobashi, Saitama (JP); Kazushi Akimoto, Saitama (JP); Hideo Murakami, Saitama (JP); Toru Takenaka, Saitama (JP); Hiroshi Gomi, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 50 days.

(21) Appl. No.: 13/394,898

(22) PCT Filed: Sep. 18, 2009

(86) PCT No.: PCT/JP2009/004776
§ 371 (c)(1),
(2), (4) Date: Mar. 8, 2012

(87) PCT Pub. No.: WO2011/033595
PCT Pub. Date: Mar. 24, 2011

(65) Prior Publication Data
US 2012/0173088 A1    Jul. 5, 2012

(51) Int. Cl.
*G01P 15/00* (2006.01)
(52) U.S. Cl.
USPC ............................ 701/49; 701/69; 73/514.36
(58) Field of Classification Search
USPC ................... 701/49, 69; 73/514.36
See application file for complete search history.

(56) References Cited

U.S. PATENT DOCUMENTS 3,348,518 A * 10/1967 Forsyth et al. ............. 440/12.66
3,876,255 A *  4/1975 Ilon ............................. 301/5.23
4,223,753 A *  9/1980 Bradbury ...................... 180/6.2
5,374,879 A * 12/1994 Pin et al. ...................... 318/139
6,042,040 A *  3/2000 Kurita et al. ............... 242/365.7
6,535,793 B2 *  3/2003 Allard ........................... 700/259
8,011,459 B2    9/2011 Serai et al.
2009/0107240 A1 *  4/2009 Senba et al. ............... 73/514.36
2009/0177323 A1 *  7/2009 Ziegler et al. ............... 700/259

FOREIGN PATENT DOCUMENTS

| JP | 4-201793 A | 7/1992 |
|---|---|---|
| JP | 2002-229656 A | 8/2002 |
| JP | 2004-129435 A | 4/2004 |
| JP | 2004-201444 A | 7/2004 |
| JP | 2006-282160 A | 10/2006 |
| JP | 2007-160956 A2 | 6/2007 |
| JP | 2009-106138 A | 5/2009 |
| JP | 2009-142127 A | 6/2009 |
| WO | 2008/026725 A1 | 3/2008 |
| WO | 2008/132778 A1 | 11/2008 |
| WO | 2008/132779 A1 | 11/2008 |
| WO | 2008/139740 A1 | 11/2008 |

* cited by examiner

*Primary Examiner* — Mary Cheung
*Assistant Examiner* — Yuen Wong
(74) *Attorney, Agent, or Firm* — Carrier Blackman & Associates, P.C.; William D. Blackman; Michael J. McCandlish

(57) ABSTRACT

Provided is a controller for an inverted pendulum type vehicle capable of moving the vehicle smoothly. The inverted pendulum type vehicle 1 is provided with a grip 18 at a upper end portion of a base body 9. A grip-acting external force F acting on the grip 18 is detected by a force sensor 55. According to the detected grip-acting external force F, a required center-of-gravity velocity generator 74 determines required center-of-gravity velocities $Vb\_x\_aim$ and $Vb\_y\_aim$, and on the basis thereof, a traveling motion unit controller determines a manipulated variable for control.

2 Claims, 14 Drawing Sheets

CONTROL DEVICE OF INVERTED PENDULUM TYPE VEHICLE

TECHNICAL FIELD

The present invention relates to a control device of an inverted pendulum type vehicle capable of moving on a floor surface.

BACKGROUND ART

An inverted pendulum type vehicle has a base body assembled with a travelling motion unit capable of travelling on a floor surface, an actuator which drives the travelling motion unit and a loading part which is freely tiltable with respect to the perpendicular direction and is used for transporting a subject. In order to maintain a tilt angle of the loading part at a desired tilt angle (to prevent the payload supporting part from tilting and falling down), it is necessary to move the travelling motion unit by displacing a fulcrum of the inverted pendulum in the inverted pendulum type vehicle.

As a control technology of this type of the inverted pendulum type vehicle, for example, the one disclosed in Patent Document 1 had been proposed by the present applicant.

In the Patent Document 1, there is disclosed a control technology of an inverted pendulum type vehicle in which a base body of a vehicle assembled with a loading part for transporting a subject, namely, an occupant, is provided so as to be freely tiltable about two axes, specifically one axis in a longitudinal direction and the other axis in a lateral direction, with respect to the travelling motion unit having a ball shape. In the control technology, a driving torque of a motor is sequentially determined so as to approximate a difference between a measured value of a tilt angle of the base body (=tilt angle of the payload supporting part) and a desired tilt angle and a difference between a measured value of a velocity of the motor as an actuator unit (and consequently a travelling velocity of the travelling motion unit) and a desired velocity to 0. Thereafter, the travelling motion of the travelling motion unit is controlled via the motor according to the determined drive torque.

The present applicant further proposes vehicles capable of functioning as the inverted pendulum type vehicle, such as those disclosed in Patent Document 2 and Patent Document 3.

PRIOR ART REFERENCES

Patent Documents

Patent Document 1: U.S. Pat. No. 3,070,015
Patent Document 2: Published PCT International Application WO/2008/132778
Patent Document 3: Published PCT International Application WO/2008/132779

SUMMARY OF THE INVENTION

Problems to be Solved by the Invention

As described in the Patent Document 1, in the inverted pendulum type vehicle configured to move according to the tilt of the payload supporting part by an occupant, in order to move the vehicle while the occupant is not aboard the payload supporting part, it is necessary for the occupant to hold the payload supporting part or the base body and tilt the base body toward a desired moving direction. However, since the vehicle is configured to operate so as to maintain the tilt angle of the payload supporting part equal to a desired tilt angle, the tilt angle tilted by the occupant will be cancelled immediately. Therefore, it is difficult to maintain the payload support part at a substantially constant angle so as to move the vehicle toward the desired moving direction smoothly. It is reasonable that it may be considered to dispose training wheels in the vehicle to allow the vehicle moving smoothly; however, it will make the structure of the vehicle complicated and the entire vehicle large-scaled, which makes it inapplicable.

Means for Solving the Problems

The present invention has been accomplished in view of the aforementioned problems, and it is therefore an object of the present invention to provide a controller for an inverted pendulum type vehicle capable of moving the vehicle smoothly.

To attain an object described above, the present invention provides a control device of an inverted pendulum type vehicle having a traveling motion unit capable of moving on a floor surface, an actuator for driving the traveling motion unit, a base body assembled with the traveling motion unit and the actuator, and a payload supporting part for an occupant assembled to the base body. The control device of an inverted pendulum type vehicle of the present invention comprises: a tilt angle measuring element configured to generate an output according to an actual tilt angle of the base body; an external force detector configured to detect an external force acting on a holding member disposed in the base body or the payload support part; and a travelling motion unit controller configured to determine a manipulated variable for control which is configured to define a driving power to be applied to the travelling motion unit according to the external force detected by the external force detector while performing a control process to maintain a measured value of the tilt angle of the base body at a desired tilt angle of a predefined value, and to control the travelling motion of the travelling motion unit via the actuator according to the determined manipulated variable for control (First aspect).

In the present invention, the term "floor" will be used to include an outdoor ground surface or a road surface rather than meaning only a floor in an ordinary sense (e.g., an indoor floor).

According to the first aspect of the present invention, when moving the vehicle, a pedestrian (an occupant not boarding the payload supporting part, it holds the same meaning hereinafter) or the like, for example, applies an external force to the holding member disposed in the base body or the payload support part while the base body is being substantially maintained at the desired tilt angle. The force acting on the holding member is detected by the external force detector, and the travelling motion unit controller determines the manipulated variable for control according to the detected external force.

Thereby, when the pedestrian or the like desires to move the vehicle, in place of tilting the payload supporting part toward the desired moving direction continuously, the pedestrian or the like can apply an external force to the holding member while the base body is being substantially maintained at the desired tilt angle so as to move the vehicle.

As mentioned in the above, according to the present invention, it is unnecessary for the pedestrian or the like to maintain the payload supporting part tilted toward the desired moving direction in moving the vehicle, the pedestrian or the like can move the vehicle smoothly as desired according to an operation by the holding member.

In the inverted pendulum type vehicle according to the first aspect of the invention, it is acceptable that the traveling motion unit is configured to be capable of moving in a predefined one direction on a floor surface and the payload supporting part is configured to be assembled at the base body so as to be tiltable about one axis in a direction orthogonal to the predefined one direction.

It is also acceptable that the traveling motion unit is configured to be capable of moving in all directions including a first direction and a second direction which are orthogonal to each other on a floor surface and the payload supporting part is configured to be assembled at the base body so as to be tiltable about two axes, specifically one axis in the first direction and the other axis in the second direction.

Herein, the traveling motion unit "being capable of moving in all directions, including the first direction and the second direction" means that the orientation of the velocity vector of the traveling motion unit at each instant observed in an axial direction orthogonal to the first direction and the second direction could take an orientation of an arbitrary angular orientation about the axial direction when the traveling motion unit is driven by the actuator. The axial direction is approximately a vertical direction or a direction perpendicular to a floor surface. Further, the term "orthogonal" in the present invention does not have to be absolutely orthogonal, and may slightly deviate from being absolutely orthogonal.

In the first aspect of the present invention, for example, the travelling motion unit controller determines the manipulated variable for control so as to reduce a magnitude of a horizontal component of the external force detected by the external force detector (Second aspect).

According to the second aspect of the present invention, the manipulated variable for control is determined so as to reduce the external force acting on the holding member. Thereby, the pedestrian or the like desiring to move the vehicle can move the vehicle smoothly with a smaller force, in other words, the vehicle can be moved smoothly.

Specifically, in the first aspect or the second aspect of the present invention, for example, the travelling motion unit controller determines the manipulated variable for control so as to match an orientation of a horizontal component of the external force detected by the external force detector with a desired moving direction of the travelling motion unit (Third aspect).

According to the third aspect of the present invention, since the orientation of the external force detected by the external force detector corresponds to the direction where the pedestrian or the like desires to move, by determining the manipulated variable for control so as to match the orientation of the detected external force with the desired moving direction of the travelling motion unit, the pedestrian or the like can move the vehicle toward a desired direction smoothly.

Further, in any of the first aspect to the third aspect of the present invention, it is acceptable that the control device of an inverted pendulum type vehicle is further provided with a representative point velocity measuring element configured to generate an output according to a representative point velocity which is an actual travelling velocity of a predefined representative point of the vehicle. For a first direction and a second direction orthogonal to each other on the floor surface, the travelling motion unit controller determines the manipulated variable for control so as to make both a first velocity deviation component for a first direction and a second velocity deviation component for a second direction to zero, the first velocity deviation component being a deviation between a velocity component in the first direction of the representative point velocity denoted by the output of the representative point velocity measuring element and a desired velocity in the first direction determined according to a force component in the first direction of the external force detected by the external force detector, and the second velocity deviation component being a deviation between a velocity component in the second direction of the representative point velocity denoted by the output of the representative point velocity measuring element and a desired velocity in the second direction determined according to a force component in the second direction of the external force detected by the external force detector (Fourth aspect).

According to the fourth aspect of the present invention, the manipulated variable for control is determined by the travelling motion unit controller in such a way that the representative point velocity denoted by the output of the representative point velocity measuring element in the first direction matches the desired velocity in the first direction determined according to the force component in the first direction of the external force detected by the external force detector and the representative point velocity in the second direction matches the desired velocity in the second direction determined according to the force component in the second direction of the external force.

According thereto, for either the first direction or the second direction, the manipulated variable for control is determined so as to make the representative point velocity converged at the desired velocity variably adjusted according to the components of the external force in each direction, enabling the pedestrian or the like to move the vehicle smoothly at a desired velocity.

Further, in any of the first aspect to the third aspect of the present invention, it is acceptable that the control device of an inverted pendulum type vehicle is further provided with a representative point velocity measuring element configured to generate an output according to a representative point velocity which is an actual travelling velocity of a predefined representative point of the vehicle. For a first direction and a second direction orthogonal to each other on the floor surface, the travelling motion unit controller determines the manipulated variable for control so as to make both a first velocity deviation component for a first direction and a second velocity deviation component for a second direction to zero, the first velocity deviation component being a deviation between a velocity component in the first direction of the representative point velocity denoted by the output of the representative point velocity measuring element and a desired velocity in the first direction determined according to a force component in the first direction of the external force detected by the external force detector, and the second velocity deviation component being a deviation between a velocity component in the second direction of the representative point velocity denoted by the output of the representative point velocity measuring element and a desired velocity which is zero in the second direction (Fifth aspect).

According to the fifth aspect of the present invention, in view of the fact that the desired moving direction by the pedestrian or the like is generally one specific direction (for example, the fore-and-aft direction), thus, it is considered that it is acceptable to reflect the external force acting on the holding member at least in the first direction. Therefore, the manipulated variable for control is determined by the travelling motion unit controller in such a way that the representative point velocity denoted by the output of the representative point velocity measuring element in the first direction matches the desired velocity in the first direction determined according to the force component in the first direction of the external force detected by the external force detector and the representative point velocity in the second direction is equal to the desired velocity in the second direction which has been set to zero.

According thereto, for the first direction, the manipulated variable for control is determined so as to make the representative point velocity converge at the desired velocity variably adjusted according to the component of the external force in the first direction; and for the second direction, the desired velocity being zero to prevent the vehicle from inclining toward the second direction, enabling the pedestrian or the like to move the vehicle smoothly at a desired velocity.

MODE FOR CARRYING OUT THE INVENTION

A first embodiment of the present invention will be described hereinafter. First, referring to FIG. 1 to FIG. 6, the structure of an inverted pendulum type vehicle in the present embodiment will be described.

Figure 1:
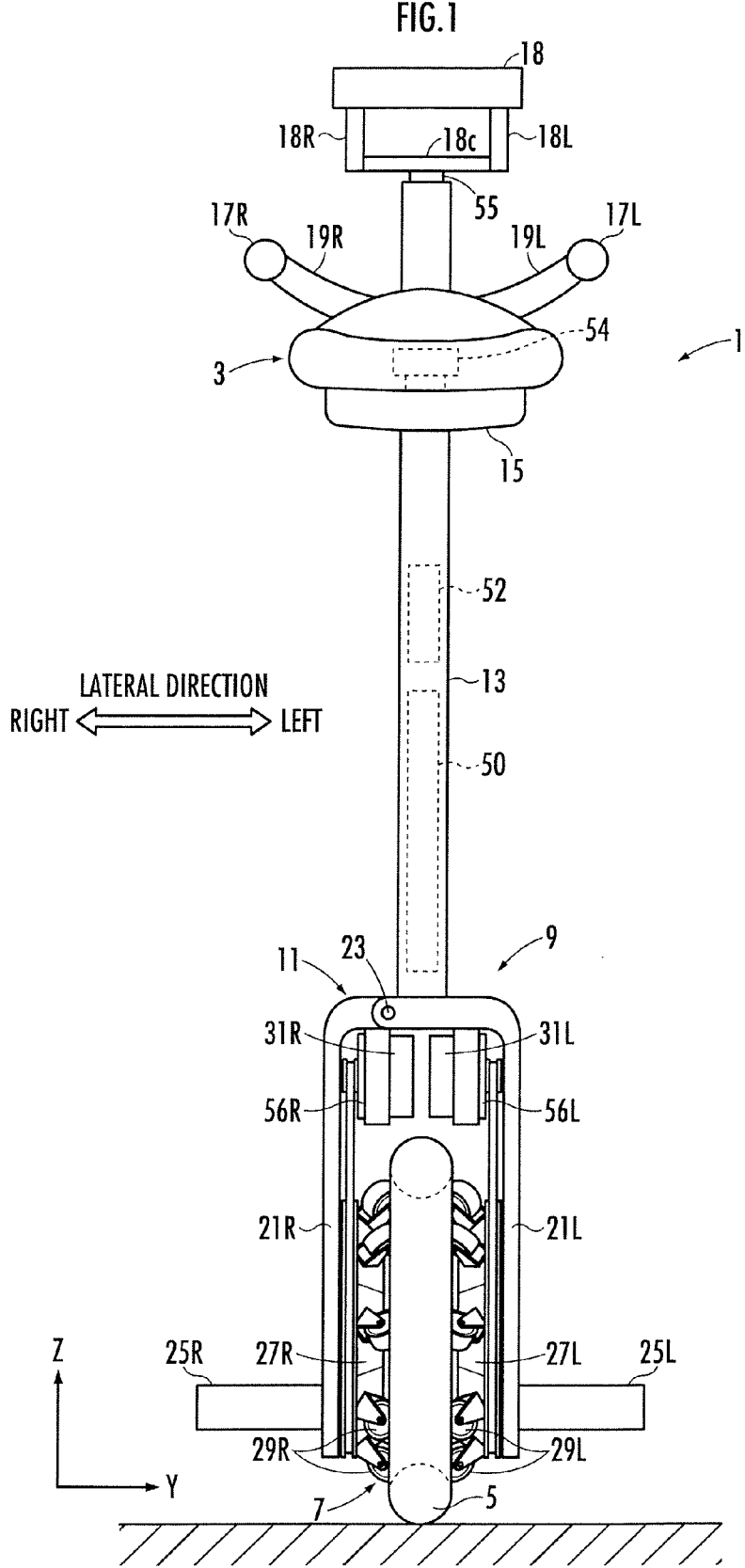
FIG. 1 is a front diagram of an inverted pendulum type vehicle according to an embodiment.
Figure 2:
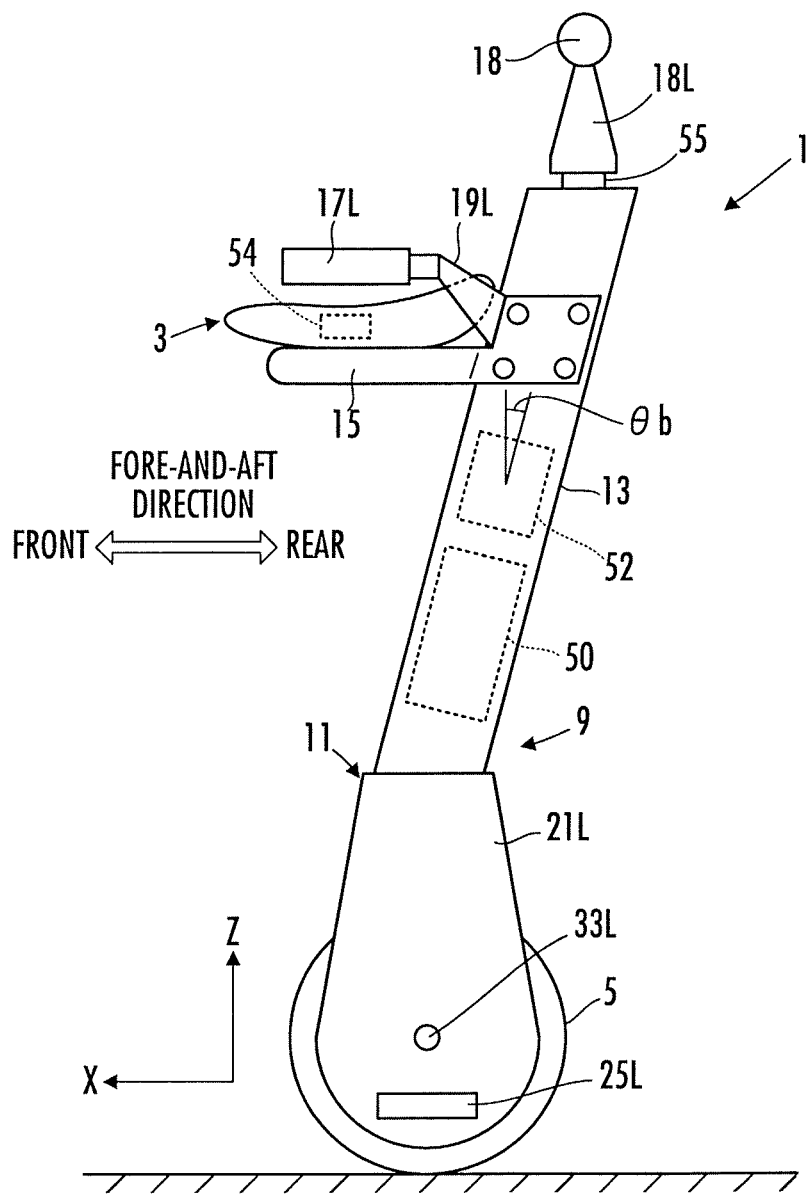
FIG. 2 is a side view of the inverted pendulum type vehicle according to the embodiment.

As illustrated in FIG. 1 and FIG. 2, an inverted pendulum type vehicle 1 in the present embodiment includes a payload supporting part 3 for an occupant (driver), a traveling motion unit 5 capable of traveling in all directions (all directions in 2 dimensions, including a fore-and-aft direction and a lateral direction) on a floor surface while being in contact with a floor surface, an actuator 7 which imparts to the traveling motion unit 5 a motive power for driving the traveling motion unit 5, and a base body 9 on which the payload supporting part 3, the traveling motion unit 5, and the actuator 7 are mounted.

Here, in the description of the present embodiment, "the fore-and-aft direction" and "the lateral direction" mean the directions that coincide or substantially coincide with the fore-and-aft direction and the lateral direction, respectively, of the upper body of an occupant aboard the payload supporting part 3 in a normal posture. "the normal posture" is a posture envisaged in the design related to the payload supporting part 3, and it is a posture in which the trunk axis of the upper body of the occupant is oriented approximately in the vertical direction and the upper body is not twisted.

In this case, in FIG. 1, "the fore-and-aft direction" and "the lateral direction" are the direction perpendicular to the paper surface and the lateral direction of the paper surface, respectively. In FIG. 2, "the fore-and-aft direction" and "the lateral direction" are the lateral direction of the paper surface and the direction perpendicular to the paper surface, respectively. Further, in the description of the present embodiment, the suffixes "R" and "L" attached to reference numerals will be used to mean the correspondence to the right side and left side of the vehicle 1, respectively.

The base body 9 is provided with a lower frame 11, to which the traveling motion unit 5 and the actuator 7 are installed, and a support frame 13 extendedly provided upward from the upper end of the lower frame 11.

A seat frame 15 extending toward the front from the support frame 13 is fixed to the top of the support frame 13. Further, the seat 3 on which an occupant sits is installed on the seat frame 15. In the present embodiment, the seat 3 serves as the payload supporting part for an occupant. Hence, the inverted pendulum type vehicle 1 in the present embodiment (hereinafter referred to simply as the vehicle 1) travels on a floor surface with an occupant seated on the seat 3.

Further, grips 17R and 17L to be grasped as necessary by the occupant seated on the seat 3 are disposed on the right and left of the seat 3. These grips 17R and 17L are secured to the distal portions of brackets 19R and 19L, respectively, which are provided extendedly from the support frame 13 (or the seat frame 15).

An upper side of the support frame 13 is disposed with a grip (equivalent to a holding member of the present invention) 18 extending in the lateral direction. The grip 18 is supported by brackets 18R and 18L at both ends thereof, respectively. The brackets 18R and 18L are configured to extend from a bracket pedestal 18C connected to the upper end portion of the support frame 13.

The lower frame 11 is provided with a pair of cover members 21R and 21L disposed to face each other in a forked shape with a gap therebetween in the lateral direction. The upper end portions (the forked portions) of these cover members 21R and 21L are connected through a hinge shaft 23 having a longitudinal axial center, so that one of the cover members 21R and 21L is relatively swingable about the hinge shaft 23 with respect to the other. In this case, the cover members 21R and 21L are biased by springs, which are not shown, in the direction in which the bottom end portions (the distal ends of the forked portions) of the cover members 21R and 21L narrow.

Further, a step 25R on which the occupant seated on the seat 3 rests his/her right foot and a step 25L on which the occupant rests his/her left foot are provided on the outer surfaces of the cover members 21R and 21L such that the steps extend out rightward and leftward, respectively.

The traveling motion unit 5 and the actuator 7 are disposed between the cover members 21R and 21L of the lower frame 11. The structures of the traveling motion unit 5 and the actuator 7 will be described with reference to FIG. 3 to FIG. 6.

The traveling motion unit 5 and the actuator 7 illustrated in the present embodiment have the same structures as those disclosed in, for example, FIG. 1 of the Patent Document 2 mentioned above. Hence, in the description of the present embodiment, the aspects of the structures of the traveling motion unit 5 and the actuator 7 which are described in the Patent Document 2 will be only briefly described.

In the present embodiment, the traveling motion unit 5 is a wheel assembly made of a rubber elastic material formed into an annular shape and has a substantially circular cross-sectional shape. This traveling motion unit 5 (hereinafter referred to as the wheel assembly 5) elastically deforms to be capable of rotating about a center C1 of the circular cross-section (more specifically, the circumferential line which passes the center C1 of the circular cross-section and which is concentric with the axial center of the wheel assembly 5), as indicated by an arrow Y1 in FIG. 5 and FIG. 6.

The wheel assembly 5 is disposed between the cover members 21R and 21L with an axial center C2 thereof (an axial center C2 orthogonal to the diametrical direction of the whole wheel assembly 5) oriented in the lateral direction, and comes in contact with a floor surface at the bottom end portion of the outer circumferential surface of the wheel assembly 5.

The wheel assembly 5 is capable of performing a motion of rotating about the axial center C2 of the wheel assembly 5 as indicated by an arrow Y2 in FIG. 5 (a motion of circumrotating on a floor surface) and a motion of rotating about the center C1 of the cross-section of the wheel assembly 5 by being driven by the actuator 7 (to be discussed in detail later). As a result, the wheel assembly 5 is capable of traveling in all directions on a floor surface by the motions combining the rotating motions. The actuator 7 is provided with a rotating member 27R and free rollers 29R interposed between the wheel assembly 5 and the right cover member 21R, a rotating member 27L and free rollers 29L interposed between the wheel assembly 5 and the left cover member 17L, an electric motor 31R serving as an actuator disposed above the rotating member 27R and the free rollers 29R, and an electric motor 31L serving as an actuator disposed above the rotating member 27L and the free rollers 29L.

The housings of the electric motors 31R and 31L are installed to the cover members 21R and 21L, respectively. Although not shown, the electric sources (batteries or capacitors) of the electric motors 31R and 31L are mounted on an appropriate place of the base body 9, such as the support frame 13 or the like.

The rotating member 27R is rotatively supported by the cover member 21R through the intermediary of a support axis 33R having a lateral axial center. Similarly, the rotating member 27L is rotatively supported by the cover member 21L through the intermediary of a support axis 33L having a lateral axial center. In this case, the rotational axial center of the rotating member 27R (the axial center of the support axis 33R) and the rotational axial center of the rotating member 27L (the axial center of the support axis 33L) are concentric with each other.

Figure 3:
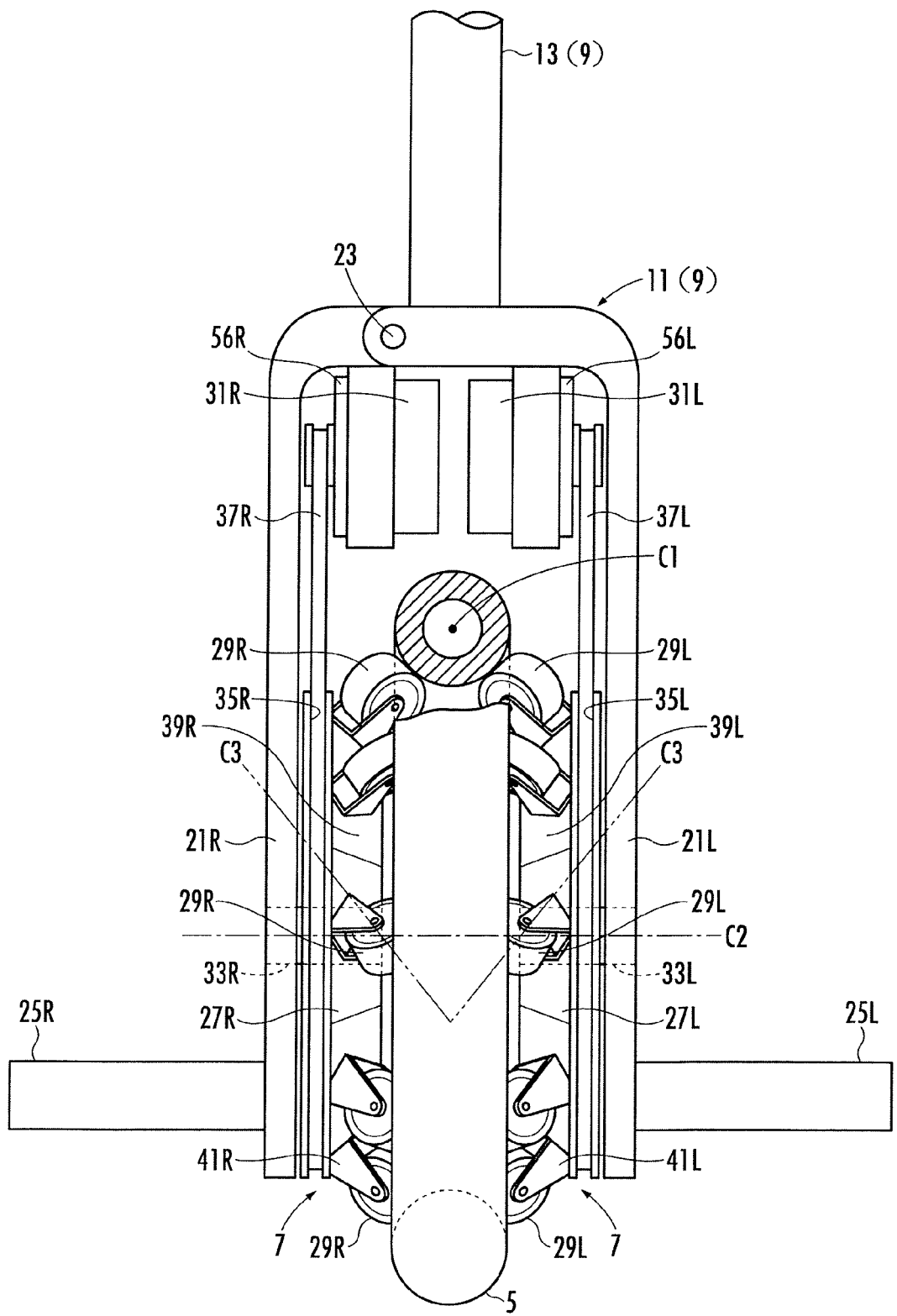
FIG. 3 is an enlarged view of a lower portion of the inverted pendulum type vehicle according to the embodiment.
Figure 4:
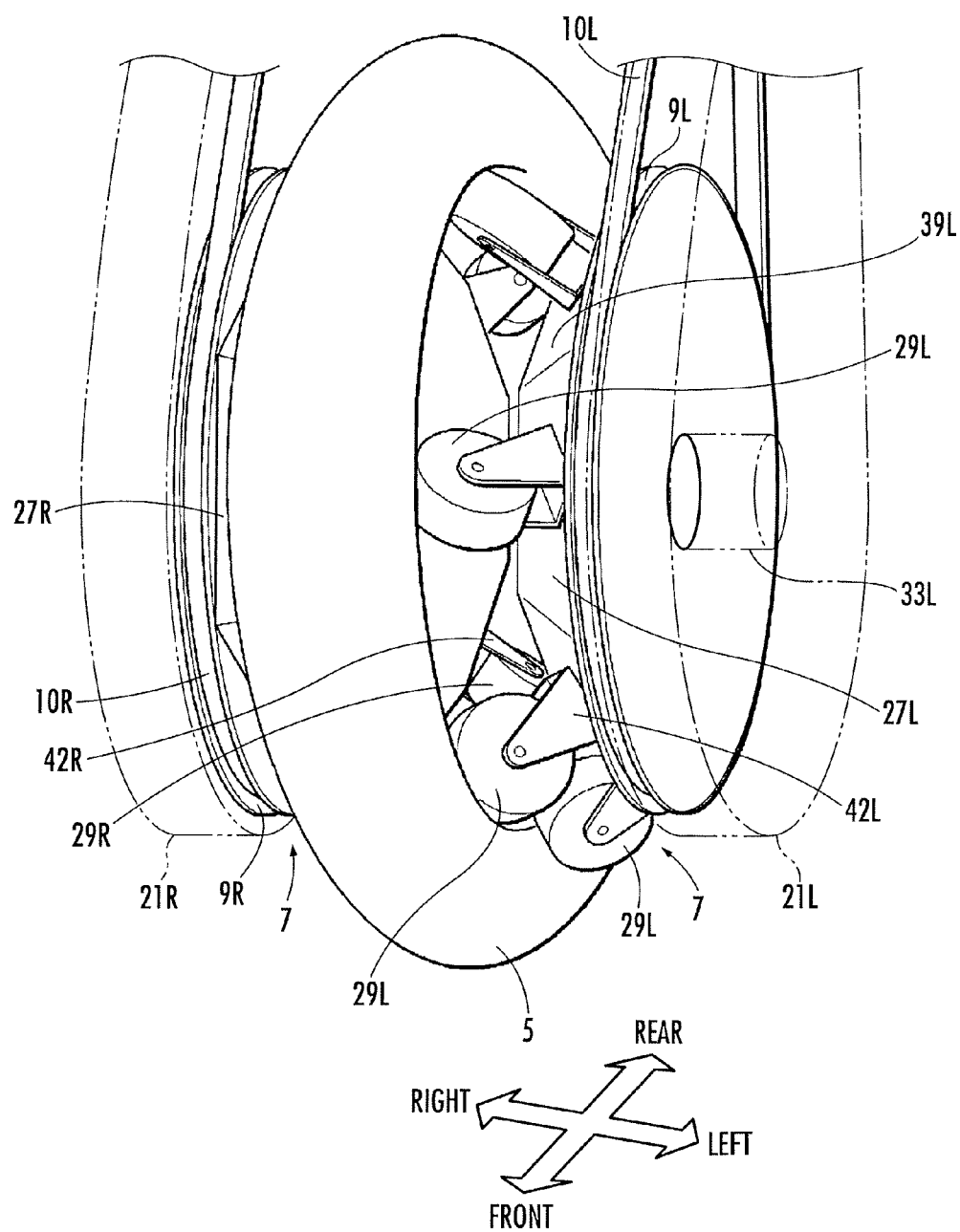
FIG. 4 is a perspective view of the lower portion of the inverted pendulum type vehicle according to the embodiment.

The rotating members 27R and 27L are connected to the output shafts of the electric motors 31R and 31L, respectively, through the intermediary of power transmission mechanisms, including functions as reducers, and rotatively driven by the motive power (torque) transmitted from the electric motors 31R and 31L, respectively. Each power transmission mechanisms are, for example, pulley and belt system. More specifically, as illustrated in FIG. 3, the rotating member 27R is connected to the output shaft of the electric motor 31R through the intermediary of a pulley 35R and a belt 37R. Similarly, the rotating member 27L is connected to the output shaft of the electric motor 31L through the intermediary of a pulley 35L and a belt 37L.

The power transmission mechanism may be constructed of, for example, a sprocket and a link chain, or may be constructed of a plurality of gears. As another alternative, for example, the electric motors 31R and 31L may be constructed such that the output shafts thereof are arranged to oppose the rotating members 27R and 27L so as to arrange the output shafts to be concentric with the rotating members 27R and 27L, and the output shafts of the electric motors 31R and 31L may be connected to the rotating members 27R and 27L, respectively, through the intermediary of reducers (e.g., planetary gear devices).

The rotating members 27R and 27L are formed in the same shapes as circular truncated cones, the diameters of which reduce toward the wheel assembly 5, and the outer peripheral surfaces thereof form tapered outer peripheral surfaces 39R and 39L. A plurality of the free rollers 29R are arrayed about the tapered outer peripheral surface 39R of the rotating member 27R such that the free rollers 29R are arranged at regular intervals on the circumference concentric with the rotating member 27R. Further, these free rollers 29R are installed to the tapered outer peripheral surface 39R through the intermediary of the brackets 41R and rotatively supported by the brackets 41R.

Similarly, a plurality of free rollers 29L (of the same quantity as that of the free rollers 29R) are arrayed about the tapered outer peripheral surface 39L of the rotary member 27L such that the free rollers 29L are arrayed at regular intervals on the circumference concentric with the rotating member 27L. Further, these free rollers 29L are installed to the tapered outer peripheral surface 39L through the intermediary of the brackets 41L and rotatively supported by the brackets 41L.

The wheel assembly 5 is disposed concentrically with the rotating members 27R and 27L, and held between the free rollers 29R adjacent to the rotating member 27R and the free rollers 29L adjacent to the rotating member 27L.

Figure 6:
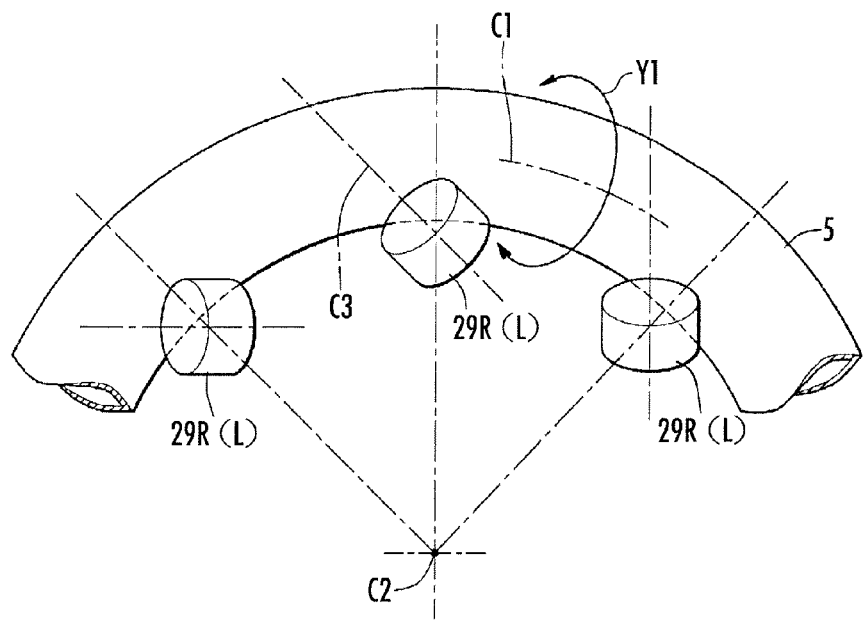
FIG. 6 is a diagram illustrating the placement relationship between the traveling motion unit (wheel assembly) and free rollers of the inverted pendulum type vehicle according to the embodiment.

In this case, as illustrated in FIG. 1 and FIG. 6, the free rollers 29R and 29L are disposed in postures in which the axial centers C3 thereof are inclined against the axial center C2 of the wheel assembly 5 and also inclined against the diametrical direction of the wheel assembly 5 (the radial direction connecting the axial center C2 and the free rollers 29R and 29L when the wheel assembly 5 is observed in the direction of the axial center C2 thereof). Further, in the postures, the outer peripheral surfaces of the free rollers 29R and 29L, respectively, are pressed into contact aslant with the inner peripheral surface of the wheel assembly 5.

More generally speaking, the right free rollers 29R are pressed into contact with the inner peripheral surface of the wheel assembly 5 in postures in which a frictional force component in the direction about the axial center C2 (a frictional force component in the tangential direction of the inner periphery of the wheel assembly 5) and a frictional force component in the direction about the center C1 of the cross-section of the wheel assembly 5 (a frictional force component in the tangential direction of the circular cross section) can be applied to the wheel assembly 5 at a surface in contact with the wheel assembly 5 when the rotating member 27R is rotatively driven about the axial center C2. The same applies to the left free rollers 29L.

In this case, as described above, the cover members 21R and 21L are biased by the springs, which are not shown, in the direction for narrowing the bottom end portions (the distal ends of the forked portions) of the cover members 21R and 21L. Thus, the urging force holds the wheel assembly 5 between the right free rollers 29R and the left free rollers 29L, and the free rollers 29R and 29L are maintained in the press contact with the wheel assembly 5 (more specifically, the press contact state that enables a frictional force to act between the free rollers 29R and 29L and the wheel assembly 5). In the vehicle 1 having the structure described above, when the rotating members 27R and 27L are rotatively driven at the same velocity in the same direction by the electric motors 31R and 31L, respectively, the wheel assembly 5 will rotate about the axial center C2 in the same direction as those of the rotating members 27R and 27L. This causes the wheel assembly 5 to circumrotate on a floor surface in the fore-and-aft direction and the whole vehicle 1 will travel in the fore-and-aft direction. In this case, the wheel assembly 5 does not rotate about the center C1 of the cross-section thereof.

Further, if, for example, the rotating members 27R and 27L are rotatively driven in opposite directions from each other at velocities of the same magnitude, then the wheel assembly 5 will rotate about the center C1 of the cross section thereof. This causes the wheel assembly 5 to travel in the direction of the axial center C2 thereof (i.e., in the lateral direction), thus causing the whole vehicle 1 to travel in the lateral direction. In this case, the wheel assembly 5 does not rotate about the axial center C2 thereof.

Further, if the rotating members 27R and 27L are rotatively driven in the same direction or opposite directions at velocities that are different from each other (velocities including directions), then the wheel assembly 5 will rotate about the axial center C2 and also rotate about the center C1 of the cross-section thereof.

At this time, motions combining the rotational motions (combined motions) cause the wheel assembly 5 to travel in directions inclined relative to the fore-and-aft direction and the lateral direction, thus causing the whole vehicle 1 to travel in the same direction as that of the wheel assembly 5. The traveling direction of the wheel assembly 5 in this case will change, depending upon the difference between the rotational velocities, including the rotational directions, of the rotating members 27R and 27L (the rotational velocity vectors, the polarities of which are defined according to rotational directions).

The traveling motions of the wheel assembly 5 effected as described above. Therefore, by controlling the rotational velocities (including the rotational directions) of the electric motors 31R and 31L, and consequently by controlling the rotational velocities of the rotating members 27R and 27L, it becomes possible to control the traveling velocity and the traveling direction of the vehicle 1.

The seat 3 and the base body 9 are tiltable about the lateral axial center C2, the axial center C2 of the wheel assembly 5 being the supporting point, and also tiltable together with the wheel assembly 5 about the longitudinal axis, the ground contact surface (the lower end surface) of the wheel assembly 5 being the supporting point. The construction for controlling the operation of the vehicle 1 according to the present embodiment will now be described. In the following description, assuming an XYZ coordinate system, in which the longitudinal horizontal axis is indicated by an X-axis, the lateral horizontal axis is indicated by a Y-axis, and the vertical direction is indicated by a Z-axis, as illustrated in FIG. 1 and FIG. 2, the fore-and-aft direction and the lateral direction may be referred to as the X-axis direction and the Y-axis direction, respectively.

First, the control of the operation of the vehicle 1 will be outlined. According to the present embodiment, basically, if the occupant seated on the seat 3 tilts his/her upper body (more specifically, if the upper body is tilted such that the position of the overall center-of-gravity point combining the occupant and the vehicle 1 (the position projected onto a horizontal plane) is moved), then the base body 9 is tilted together with the seat 3 toward the side to which the upper body has been tilted. At this time, the traveling motion of the wheel assembly 5 is controlled such that the vehicle 1 travels toward the side to which the base body 9 has tilted. For example, if the occupant tilts his/her upper body forward, causing the base body 9 to tilt forward together with the seat 3, then the traveling motion of the wheel assembly 5 is controlled to cause the vehicle 1 to travel forward.

In other words, according to the present embodiment, the operation in which the occupant moves his/her upper body, causing the seat 3 and the base body 9 to tilt provides one basic steering operation for the vehicle 1 (a motion request of the vehicle 1), and the traveling motion of the wheel assembly 5 is controlled through the actuator 7 according to the steering operation.

Here, in the vehicle 1 according to the present embodiment, the ground contact surface of the wheel assembly 5 as the ground contact surface of the whole vehicle 1 will be a single local region which is smaller than a region resulting from projecting all the vehicle 1 and the occupant thereon onto a floor surface, and a floor reaction force will act only on the single local region. For this reason, in order to prevent the base body 9 from falling due to tilting, the wheel assembly 5 must be moved such that the overall center-of-gravity point of the occupant and the vehicle 1 is positioned substantially right above the ground contact surface of the wheel assembly 5.

Therefore, according to the present embodiment, the posture of the base body 9 in a state wherein the overall center-of-gravity point of the occupant and the vehicle 1 is positioned substantially right above the central point of the wheel assembly 5 (the central point on the axial center C2) (more precisely, in a state wherein the center-of-gravity point is positioned substantially right above the ground contact surface of the wheel assembly 5) is defined as a desired posture, and basically, the traveling motion of the wheel assembly 5 is controlled such that the actual posture of the base body 9 is converged to the desired posture.

Further, in a state wherein the occupant is not aboard the vehicle 1, the posture of the base body 9 in a state which the center-of-gravity point of the vehicle 1 alone is positioned substantially right above the central point of the wheel assembly 5 (the central point on the axial center C2) (a state wherein the center-of-gravity point is positioned substantially right above the ground contact surface of the wheel assembly 5) is defined as a desired posture, and the actual posture of the base body 9 is converged to the desired posture. Thus, the traveling motion of the wheel assembly 5 is controlled such that the vehicle 1 supports itself without causing the base body 9 to fall from tilting.

Either in the state where the occupant is aboard the vehicle 1 or in the state where the occupant is not aboard the vehicle 1, the motion operation of the wheel assembly 5 is controlled to increase the travelling velocity of the vehicle 1 when the deviation of the actual posture of the base body 9 from the desired posture becomes greater and to stop the vehicle 1 from travelling in a state where the actual posture of the base body 9 matches the desired posture.

Supplementally, "the posture" means a spatial orientation. In the present embodiment, when the base body 9 tilts together with the seat 3, the postures of the base body 9 and the seat 3 change. Further, in the present embodiment, the base body 9 and the seat 3 integrally tilt, so that converging the posture of the base body 9 to the desired posture is equivalent to converging the posture of the seat 3 to a desired posture associated with the seat 3 (the posture of the seat 3 in a state wherein the posture of the base body 9 coincides with a desired posture of the base body 9).

According to the present embodiment, in order to control the operation of the vehicle 1 as described above, a control unit 50 composed of an electronic circuit unit which mainly includes a microcomputer and a drive circuit unit for the electric motors 31R and 31L, a tilt sensor 52 for measuring a tilt angle θb relative to the vertical direction (the gravitational direction) of a predefined portion of the base body 9 and a changing velocity thereof (=dθb/dt) as a state amount related to the posture of the base body 9 (or the posture of the seat 3), a load sensor 54 for detecting whether or not an occupant is aboard the vehicle 1, a force sensor 55 for detecting an external force acting on the grip 18, and rotary encoders 56R and 56L serving as angle sensors for detecting the rotational angles and the rotational angular velocities of the output shafts of the electric motors 31R and 31L, respectively, are mounted at appropriate places of the vehicle 1, as illustrated in FIG. 1 and FIG. 2.

In this case, the control unit 50 and the tilt sensor 52 are installed to the support frame 13 by, for example, being accommodated in the support frame 13 of the base body 9. Further, the load sensor 54 is incorporated in the seat 3. Further, the rotary encoders 56R and 56L are provided integrally with the electric motors 31R and 31L, respectively. The rotary encoders 56R and 56L may alternatively be attached to the rotating members 27R and 27L, respectively.

More specifically, the tilt sensor 52 is constructed of an acceleration sensor and a rate sensor (angular velocity sensor), such as a gyro sensor, and outputs detection signals of these sensors to the control unit 50. Then, the control unit 50 performs predefined measurement arithmetic process (this may be publicly known arithmetic process) on the basis of the outputs of the acceleration sensor and the rate sensor of the tilt sensor 52 thereby to calculate the measured value of the tilt angle θb of the portion, to which the tilt sensor 52 is installed (the support frame 13 in the present embodiment), relative to the vertical direction and the measured value of the tilt angular velocity θbdot, which is a change rate (differential value) thereof.

In this case, to be more specific, the tilt angle θb to be measured (hereinafter referred to a base body tilt angle θb in some cases) is composed of a component in the direction about the Y-axis (a pitch direction) θb_x and a component in the direction about the X-axis (a roll direction) θb_y. Similarly, the tilt angular velocity θbdot to be measured (hereinafter referred to a base body tilt angular velocity θbdot in some cases) is composed of a component in the direction about the Y-axis (the pitch direction) θbdot_x (=dθb_x/dt) and a component in the direction about the X-axis (the roll direction) θbdot_y (=dθb_y/dt).

Supplementally, according to the present embodiment, the seat 3 tilts integrally with the support frame 13 of the base body 9, so that the base body tilt angle θb also equals to the tilt angle of the payload supporting part 3.

In the description of the present embodiment, regarding variables, such as a motional state amount having components in directions of the X-axis and the Y-axis, such as the base body tilt angle θb (or directions about each axes), or variables, such as coefficients related to the motional state amount, the reference numerals of the variables will be accompanied by a suffix "_x" or "_y" to distinguishably denote the components.

Accordingly, for the variables related to translational motions related to a translational velocity, a component in the X-axis direction thereof will be accompanied by the suffix "_x" and a component in the Y-axis direction thereof will be accompanied by the suffix "_y."

Meanwhile, for the variables related to rotational motions, such as angles, rotational velocities (angular velocities), and angular acceleration, for the purpose of convenience, a component in the direction about the Y-axis will be accompanied by the suffix "_x" and a component in the direction about the X-axis will be accompanied by the suffix "_y" in order to match the variables related to translational motions with suffixes.

Further, to denote a variable in the form of a pair of a component in the X-axis direction (or a component in the direction about the Y-axis) and a component in the Y-axis direction (or a component in the direction about the X-axis), the suffix "_xy" is added to the reference numeral of the variable. For example, to express the base body tilt angle θb in the form of the pair of a component in the direction about the Y-axis θb_x and a component in the direction about the X-axis θb_y, it will be denoted as the base body tilt angle θb_xy.

The load sensor 54 is incorporated in the seat 3 so as to be subjected to a load from the weight of an occupant when the occupant sits on the seat 3, and outputs a detection signal based on the load to the control unit 50. Then, the control unit 50 determines whether or not the occupant is aboard the vehicle 1 on the basis of the measured value of the load indicated by the output of the load sensor 54.

In place of the load sensor 54, a switch type sensor which, for example, turns on when an occupant sits on the seat 3 may be used.

The force sensor 55 is disposed between the upper end portion of the support frame 13 and the bracket pedestal 18C and is configured to output a detection signal to the control unit 50 according to an external force acting on the grip 18 (hereinafter, referred to as grip-acting external force F). The force sensor 55 here is a force sensor (for example, a biaxial force sensor) capable of detecting translational forces in two axial directions orthogonal to each other, and the directions of detection axes thereof are disposed along the fore-and-aft direction and the lateral direction of the vehicle 1, respectively. Specifically, in a state where a base body tilt angle θb_xy is in agreement with a desired value θb_xy_obj, for example, for an autonomous mode to be described hereinafter, the force sensor 55 is disposed in such a way that the directions of the detection axes of the force sensor 55 are in agreement with the X-axis direction and the Y-axis direction, respectively. On the basis of the output from the force sensor 55, the control unit 50 determines a measured value of the X-axis direction component Fx and a measured value of the Y-axis direction component Fy in the grip-acting external force F.

In the output from the force sensor 55, the control unit 50 determines a translational force denoting the output related to the detection axis corresponding to the fore-and-aft direction of the vehicle 1 as the measured value of Fx and a translational force denoting the output related to the detection axis corresponding to the lateral direction of the vehicle 1 as the measured value of Fy. When the force sensor 55 tilts together with the base body 9 to a state where the base body tilt angle θb_xy is not in agreement with the desired value θb_xy_obj for the autonomous mode, the directions of the two detection axes of the force sensor 55 deviate from the X-axis direction and the Y-axis direction, respectively. Therefore, in order to determine the measure values of Fx and Fy more accurately, it is desired to determine the measure values of Fx and Fy by performing a coordinate transformation on the grip-acting external force F denoted by the output from the force sensor 55 (force vectors recognized in a coordinate system fixed in the force sensor 55) in relation to a base body tilt angle measured value $\theta b\_xy\_s$ based on the output from the tilt sensor 52.

The rotary encoder 56R generates a pulse signal each time the output shaft of the electric motor 31R rotates for a predefined angle, and outputs the pulse signal to the control unit 50. Then, based on the pulse signal, the control unit 50 measures the rotational angle of the output shaft of the electric motor 31R and further measures the temporal change rate (differential value) of the measured value of the rotational angle as the rotational angular velocity of the electric motor 31R. The same applies to the rotary encoder 56L for the electric motor 31L.

The control unit 50 performs a predefined arithmetic process by using the measured values thereby to determine velocity commands, which are the desired values of the rotational angular velocities of the electric motors 31R and 31L, respectively, and performs a feedback control on the rotational angular velocity of each of the electric motors 31R and 31L according to the determined velocity commands.

The rotational angular velocity of the output shaft of the electric motor 31R and the rotational angular velocity of the rotating member 27R have a proportional relationship based on the speed reduction ratio of a constant value between the output shaft and the rotating member 27R. Hence, for the sake of convenience, in the description of the present embodiment, the rotational angular velocity of the electric motor 31R may be used to express the rotational angular velocity of the rotating member 27R. Similarly, the rotational angular velocity of the electric motor 31L may be used to express the rotational angular velocity of the rotating member 27L.

The following will describe in more detail the control process performed by the control unit 50.

Figure 7:
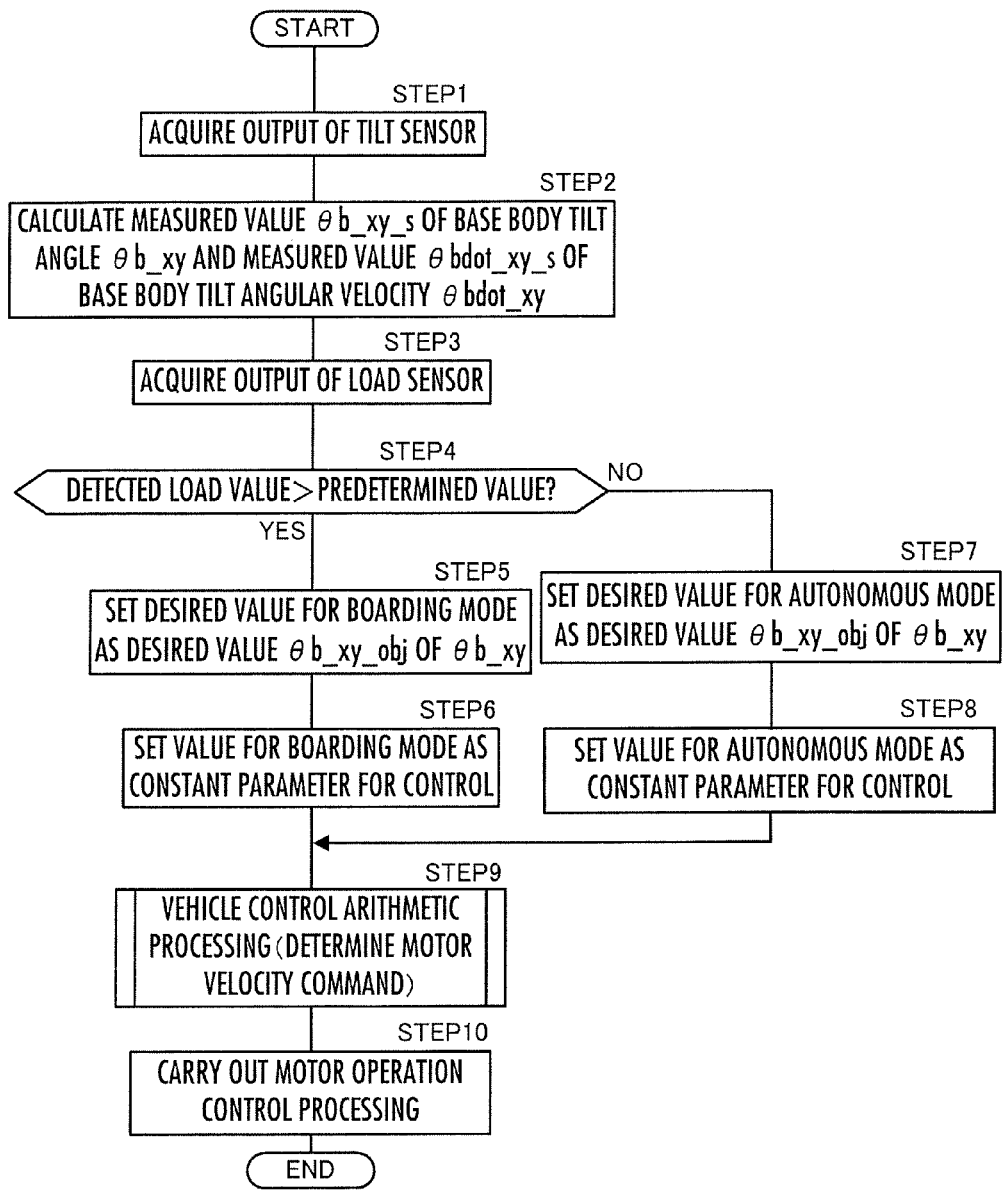
FIG. 7 is a flowchart illustrating a process performed by a control unit of the inverted pendulum type vehicle according to the embodiment.

The control unit 50 executes the control process (main routine process) illustrated by the flowchart of FIG. 7 at a predefined control process cycle.

First, in STEP 1, the control unit 50 acquires an output of a tilt sensor 52.

Subsequently, the control unit 50 proceeds to STEP 2 to calculate a measured value $\theta b\_xy\_s$ of a base body tilt angle $\theta b$ and a measured value $\theta bdot\_xy\_s$ of a base body tilt angular velocity $\theta bdot$ on the basis of the acquired output of the tilt sensor 52.

In the following description, when using a reference numeral to denote the observed value (the measured value or an estimated value) of an actual value of a variable (a state amount), such as the measured value $\theta b\_xy\_s$, the reference numeral of the variable will have a suffix "_s".

Next, after acquiring an output of a load sensor 54 in STEP 3, the control unit 50 performs a determination process in STEP 4. In the determination process, the control unit 50 determines whether or not the vehicle 1 has an occupant aboard (whether or not an occupant is sitting on the seat 3) by determining whether or not the load measured value indicated by the acquired output of the load sensor 54 is larger than a predefined value which has been set beforehand.

If the determination result in STEP 4 is affirmative, then the control unit 50 performs a process for setting a desired value $\theta b\_xy\_obj$ of the base body tilt angle $\theta b$ and a process for setting the values of constant parameters (e.g., the basic values of various gains) for controlling the operation of the vehicle 1 in STEP 5 and STEP 6, respectively.

In STEP 5, the control unit 50 sets a predefined desired value for a boarding mode as the desired value $\theta b\_xy\_obj$ of the base body tilt angle $\theta b$.

Here, the term "boarding mode" means the operation mode of the vehicle 1 in the case where the occupant is aboard the vehicle 1. The desired value $\theta b\_xy\_obj$ for the boarding mode is preset such that desired value $\theta b\_xy\_obj$ coincides or substantially coincides with the measured value $\theta b\_xy\_s$ of the base body tilt angle $\theta b$ measured on the basis of an output of the tilt sensor 52 in a posture of the base body 9 in which the overall center-of-gravity point of the vehicle 1 and the occupant seated on the seat 3 (hereinafter referred to as the vehicle-occupant overall center-of-gravity point) is positioned substantially right above a ground contact surface of the wheel assembly 5.

Thereafter, in STEP 6, the control unit 50 sets predefined values for the boarding mode as the values of constant parameters for controlling the operation of the vehicle 1. The constant parameters include, for example, hx, hy, $Ki\_a\_x$, $Ki\_b\_x$, $Ki\_a\_y$, and $Ki\_b\_y$ (i=1, 2, 3), which will be discussed later.

On the other hand, if the determination result in STEP 4 is negative, then the control unit 50 performs the process for setting a desired value $\theta b\_xy\_obj$ of a base body tilt angle $\theta b\_xy$ and the process for setting the values of constant parameters for controlling the operation of the vehicle 1 in STEP 7 and STEP 8, respectively.

In STEP 7, the control unit 50 sets a predefined desired value for an autonomous mode as the desired value $\theta b\_xy\_obj$ of the base body tilt angle $\theta b$.

Here, the term "autonomous mode" means an operation mode of the vehicle 1 in the case where the occupant is not aboard the vehicle 1. As to be described hereinafter, the autonomous mode includes two modes: a moving mode configured to move the vehicle 1, and a halting mode configured to maintain the vehicle 1 at a halt state.

The desired value $\theta b\_xy\_obj$ for the autonomous mode (either the moving mode or the halting mode) is preset such that desired value $\theta b\_xy\_obj$ coincides or substantially coincides with the measured value $\theta b\_xy\_s$ of the base body tilt angle $\theta b$ measured on the basis of an output of the tilt sensor 52 in a posture of the base body 9 in which the center-of-gravity point of the vehicle 1 alone (hereinafter referred to as the vehicle-alone center-of-gravity point) is positioned substantially right above the ground contact surface of the wheel assembly 5. The desired value $\theta b\_xy\_obj$ for the autonomous mode is generally different from the desired value $\theta b\_xy\_obj$ for the boarding mode.

In STEP 8, the control unit 50 sets predefined values for the autonomous mode as the values of constant parameters for controlling the operation of the vehicle 1. The values of the constant parameters for the autonomous mode are different from the values of the constant parameters for the boarding mode.

The values of the constant parameters are set to be different between the boarding mode and the autonomous mode, because the response characteristics of the operations of the vehicle 1 relative to control inputs are different from each other due to the differences in the height of the center-of-gravity point, the overall mass, and the like between the respective modes.

According to the processes from STEP 4 to STEP 8 described above, the desired value $\theta b\_xy\_obj$ of the base body tilt angle $\theta b\_xy$ and the values of the constant parameters are set for each of the operational modes, namely, the boarding mode and the autonomous mode.

It is not essential to perform the process in STEP 5 and STEP 6 or the process in STEP 7 and STEP 8 for each control processing cycle. Alternatively, the process may be performed only when the determination result in STEP 4 changes.

Supplementally, in both the boarding mode and the autonomous mode, the desired value of a component θbdot_x in the direction about a Y-axis of the base body tilt angular velocity θbdot and the desired value of a component θbdot_y in the direction about an X-axis thereof are both 0. Therefore, it is unnecessary to perform the process for setting a desired value of the base body tilt angular velocity θbdot_xy.

After performing the process in STEP 5 and STEP 6 or the process in STEP 7 and STEP 8 as described above, the control unit 50 performs vehicle control arithmetic process in STEP 9 thereby to determine the speed commands for electric motors 31R and 31L, respectively. The vehicle control arithmetic process will be discussed in detail hereinafter.

Subsequently, the control unit 50 proceeds to STEP 10 to perform the process for controlling the operations of the electric motors 31R and 31L according to the speed commands determined in STEP 9. In this operation control process, based on the difference between the speed command for the electric motor 31R determined in STEP 9 and the measured value of the rotational speed of the electric motor 31R measured on the basis of an output of a rotary encoder 56R, the control unit 50 determines a desired value (desired torque) of an output torque of the electric motor 31R such that the difference is converged to 0. Then, the control unit 50 controls the current supplied to the electric motor 31R such that the electric motor 31R outputs an output torque of the desired torque. The same applies to the operation control of the left electric motor 31L.

The above has described the general control process performed by the control unit 50.

The vehicle control arithmetic process in STEP 9 mentioned above will now be described in detail.

In the following description, the vehicle-occupant overall center-of-gravity point in the boarding mode and the vehicle-alone center-of-gravity point in the autonomous mode are generically referred to as the vehicle system center-of-gravity point. The vehicle system center-of-gravity point is referred to as the vehicle-occupant overall center-of-gravity point when the operational mode of the vehicle 1 is in the boarding mode and is referred to as the vehicle-alone center-of-gravity point when the operational mode of the vehicle 1 is in the autonomous mode.

Further, in the following description, regarding the values (updated values) determined at each control processing cycle by the control unit 50, a value determined at a current (latest) control processing cycle may be referred to as a current value, and a value determined at an immediately preceding control processing cycle may be referred to as a previous value. Further, a value generally denotes a current value unless otherwise specified as a current value or a previous value.

Further, regarding the velocity and acceleration in the X-axis direction, a forward-facing direction will be defined as a positive direction, and regarding the velocity and acceleration in the Y-axis direction, a left-facing direction will be defined as the positive direction.

Figure 8:
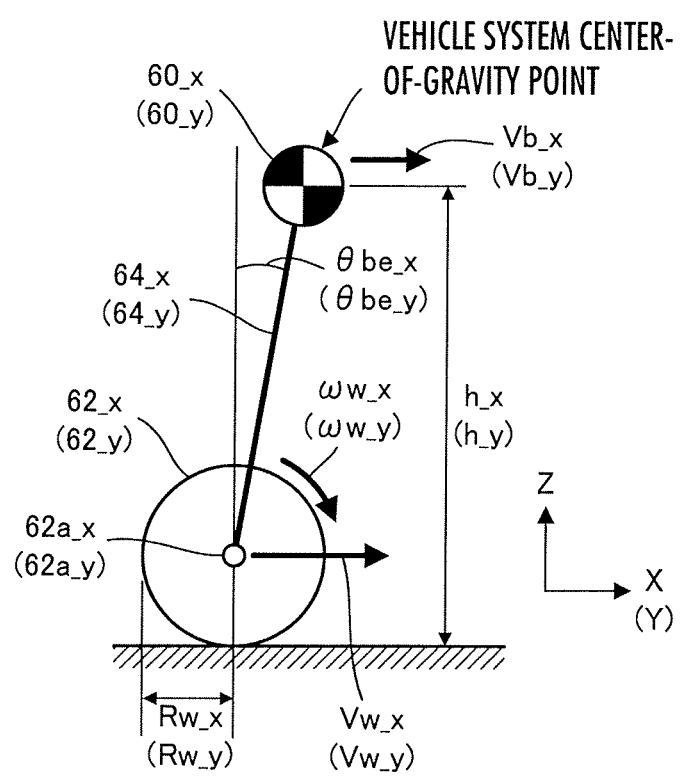
FIG. 8 is a diagram illustrating an inverted pendulum model expressing the dynamic behaviors of the inverted pendulum type vehicle according to the embodiment.

In the present embodiment, the vehicle control arithmetic process in STEP 9 is performed, assuming that the dynamic behaviors of the vehicle system center-of-gravity point (more specifically, the behaviors observed by projecting the behaviors from the Y-axis direction onto a plane (XZ plane) which is orthogonal thereto, and the behaviors observed by projecting the behaviors from the X-axis direction onto a plane (YZ plane) which is orthogonal thereto) are approximately expressed by the behaviors of an inverted pendulum model (dynamic behaviors of the inverted pendulum), as shown in FIG. 8.

In FIG. 8, the reference numerals without parenthesis denote the reference numerals associated with the inverted pendulum model observed from the Y-axis direction, while the reference numerals in parenthesis denote the reference numerals associated with the inverted pendulum model observed from the X-axis direction.

In this case, the inverted pendulum model expressing a behavior observed from the Y-axis direction is provided with a mass point 60_x positioned at the vehicle system center-of-gravity point and a imaginary wheel 62_x, which has a rotational axis 62a_x parallel to the Y-axis direction and which freely circumrotate on a floor surface (hereinafter referred to as the imaginary wheel 62_x). Further, the mass point 60_x is supported by a rotational shaft 62a_x of the imaginary wheel 62_x through the intermediary of a linear rod 64_x such that the mass point 60_x is swingable about the rotational shaft 62a_x, using the rotational shaft 62a_x as a fulcrum.

In this inverted pendulum model, a motion of the mass point 60_x corresponds to a motion of the vehicle system center-of-gravity point observed from the Y-axis direction. Further, it is assumed that the tilt angle θbe_x of the rod 64_x relative to a vertical direction coincides with a difference θbe_x_s between a base body tilt angle measured value θb_x_s in the direction about the Y-axis and a base body tilt angle desired value θb_x_obj (=θb_x_s−θb_x_obj). It is also assumed that a changing velocity of the tilt angle θbe_x of the rod 64_x (=dθbe_x/dt) coincides with a base body tilt angular velocity measured value θbdot_x_s in the direction about the Y-axis. Further, it is assumed that a moving velocity Vw_x of the imaginary wheel 62_x (the translational moving velocity in the X-axis direction) coincides with the moving velocity of the wheel assembly 5 of the vehicle 1 in the X-axis direction.

Similarly, the inverted pendulum model expressing a behavior observed from the X-axis direction (refer to the reference numerals in parenthesis in FIG. 8) is provided with a mass point 60_y positioned at the vehicle system center-of-gravity point and a imaginary wheel 62_y, which has a rotational axis 62a_y parallel to the X-axis direction and which freely circumrotate on a floor surface (hereinafter referred to as the imaginary wheel 62_y). Further, the mass point 60_y is supported by a rotational shaft 62a_y of the imaginary wheel 62_y through the intermediary of a linear rod 64_y such that the mass point 60_y is swingable about the rotational shaft 62a_y, using the rotational shaft 62a_y as the supporting point.

In this inverted pendulum model, a motion of the mass point 60_y corresponds to a motion of the vehicle system center-of-gravity point observed from the X-axis direction. Further, it is assumed that the tilt angle θbe_y of the rod 64_y relative to the vertical direction coincides with a difference θbe_y_s between a base body tilt angle measured value θb_y_s in the direction about the X-axis and a base body tilt angle desired value θb_y_obj (=θb_y_s−θb_y_obj). It is also assumed that a changing velocity of the tilt angle θbe_y of the rod 64_y (=dθbe_y/dt) coincides with a base body tilt angular velocity measured value θbdot_y_s in the direction about the X-axis. Further, it is assumed that a moving velocity Vw_y of the imaginary wheel 62_y (the translational moving velocity in the Y-axis direction) coincides with the moving velocity of the wheel assembly 5 of the vehicle 1 in the Y-axis direction.

It is assumed that the imaginary wheels 62_x and 62_y have radii Rw_x and Rw_y of predefined values, respectively.

It is assumed that relationships represented by expressions 01a and 01b given below hold between rotational angular velocities ωw_x and ωw_y of the imaginary wheels 62_x and 62_y, respectively, and rotational angular velocities ω_R and ω_L of the electric motors 31R and 31L, respectively (more accurately, the rotational angular velocities ω_R and ω_L of rotational members 27R and 27L, respectively).

$$\omega w\_x = (\omega\_R + \omega\_L)/2 \qquad \text{Expression 01a}$$

$$\omega w\_y = C \cdot (\omega\_R - \omega\_L)/2 \qquad \text{Expression 01b}$$

Wherein, "C" in the expression 01b denotes a coefficient of a predefined value that depends on a mechanical relationship or slippage between free rollers 29R and 29L and the wheel assembly 5. The positive directions of ωw_x, ω_R and ω_L are the directions in which the imaginary wheel 62_x rotates in the case where the imaginary wheel 62_x circumrotates forward. The positive direction of ωw_y is the direction in which the imaginary wheel 62_y rotates in the case where the imaginary wheel 62_y circumrotates leftwards.

The dynamics of the inverted pendulum model shown in FIG. 8 is represented by expressions 03x and 03y given below. Herein, the expression 03x represents the dynamics of the inverted pendulum model observed from the Y-axis direction, and the expression 03y represents the dynamics of the inverted pendulum model observed from the X-axis direction.

$$d^2\theta be\_x/dt^2 = \alpha\_x \cdot \theta be\_x + \beta\_x \cdot \omega wdot\_x \qquad \text{Expression 03x}$$

$$d^2\theta be\_y/dt^2 = \alpha\_y \cdot \theta be\_y + \beta\_y \cdot \omega wdot\_y \qquad \text{Expression 03y}$$

Wherein, ωwdot_x in the expression 03x denotes the rotational angular acceleration (first-order differential value of the rotational angular velocity ωw_x) of the imaginary wheel 62_x, α_x denotes a coefficient which depends on a mass or a height h_x of the mass point 60_x, and β_x denotes a coefficient which depends on an inertia (inertial moment) or the radius Rw_x of the imaginary wheel 62_x. The same applies to ωwdot_y, α_y, and β_y in the expression 03y.

As may be understood from these expressions 03x and 03y, the motions of the mass points 60_x and 60_y of the inverted pendulum (i.e., the motions of the vehicle system center-of-gravity point) are specified, depending on the rotational angular acceleration ωwdot_x of the imaginary wheel 62_x and the rotational angular acceleration ωwdot_y of the imaginary wheel 62_y, respectively.

In the present embodiment, therefore, the rotational angular acceleration ωwdot_x of the imaginary wheel 62_x is used as the manipulated variable (control input) for controlling the motion of the vehicle system center-of-gravity point observed from the Y-axis direction, while the rotational angular acceleration ωwdot_y of the imaginary wheel 62_y is used as the manipulated variable (control input) for controlling the motion of the vehicle system center-of-gravity point observed from the X-axis direction.

To briefly describe the vehicle control arithmetic process in STEP9, the control unit 50 determines imaginary wheel rotational angular acceleration commands ωwdot_x_cmd and ωwdot_y_cmd, which are the command values (desired values) of the rotational angular accelerations ωwdot_x and ωwdot_y as the manipulated variables such that the motion of the mass point 60_x observed in the X-axis direction and the motion of the mass point 60_y observed in the Y-axis direction become the motions corresponding to desired motions of the vehicle system center-of-gravity point. Further, the control unit 50 determines the values obtained by integrating the imaginary wheel rotational angular acceleration commands ωwdot_x_cmd and ωwdot_y_cmd, respectively, as the imaginary wheel rotational angular velocity commands ωw_x_cmd and ωw_y_cmd, which are the command values (desired values) of the rotational angular velocities ωw_x and ωw_y of the imaginary wheels 62_x and 62_y, respectively.

Further, the control unit 50 defines the moving velocity of the imaginary wheel 62_x corresponding to the imaginary wheel rotational angular velocity command ωw_x_cmd (=Rw_x·ωw_x_cmd) and the moving velocity of the imaginary wheel 62_y corresponding to the imaginary wheel rotational angular velocity command ωw_y_cmd (=Rw_y·ωw_y_cmd) as the desired moving velocity of the wheel assembly 5 of the vehicle 1 in the X-axis direction and the desired moving velocity thereof in the Y-axis direction, respectively, and the control unit 50 determines velocity commands ω_R_cmd and ω_L_cmd of the electric motors 31R and 31L, respectively, so as to achieve the desired moving velocities.

In the present embodiment, the imaginary wheel rotational angular acceleration commands ωwdot_x_cmd and ωwdot_y_cmd as the manipulated variables (control inputs) are determined by adding up three manipulated variable components, as indicated by expressions 07x and 07y, which will be discussed later.

Supplementally, in the imaginary wheel rotational angular acceleration commands ωwdot_x_cmd and ωwdot_y_cmd serving as the manipulated variables (control inputs), since ωwdot_x_cmd is related to the rotational angular acceleration of the imaginary wheel 62_x moving in the X-axis direction, it functions as the manipulated variable for defining the driving power to be applied to the wheel assembly 5 to move the wheel assembly 5 in the X-axis direction; similarly, since ωwdot_y_cmd is related to the rotational angular acceleration of the imaginary wheel 62_y moving in the Y-axis direction, it functions as the manipulated variable for defining the driving power to be applied to the wheel assembly 5 to move the wheel assembly 5 in the Y-axis direction. As illustrated in the block diagram of FIG. 9, the control unit 50 is provided with the functions for performing the vehicle control arithmetic process in STEP 9 as described above.

More specifically, the control unit 50 is provided with an error calculator 70 which calculates the base body tilt angle error measured value θbe_xy_s, which is the difference between the base body tilt angle measured value θb_xy_s and the base body tilt angle desired value θb_xy_obj, a center-of-gravity velocity calculator 72 which calculates an estimated center-of-gravity velocity value Vb_xy_s as an observed value of a center-of-gravity velocity Vb_xy, which is the moving velocity of the vehicle system center-of-gravity point, a required center-of-gravity velocity generator 74 which generates a required center-of-gravity velocity V_xy_aim as the required value of the center-of-gravity velocity Vb_xy, a center-of-gravity velocity restrictor 76 which determines a desired center-of-gravity velocity for control Vb_xy_mdfd as the desired value of the center-of-gravity velocity Vb_xy by taking into account a restriction based on a permissible range of the rotational angular velocities of the electric motors 31R and 31L from the estimated center-of-gravity velocity value Vb_xy_s and the required center-of-gravity velocity V_xy_aim, and a gain adjustor 78 which determines a gain adjustment parameter Kr_xy for adjusting the values of the gain coefficients of expressions 07x and 07y, which will be discussed later.

The control unit 50 is further provided with a posture control calculator 80 configured to calculate the imaginary wheel rotational angular velocity command ωw_xy_cmd, and a motor command calculator 82 configured to convert the imaginary wheel rotational angular velocity command ωw_xy_cmd into a pair of a velocity command ω_R_cmd (a command value of a rotational angular velocity) for the right electric motor 31R and a velocity command ω_L_cmd (a command value of a rotational angular velocity) for the left electric motor 31L.

Figure 9:
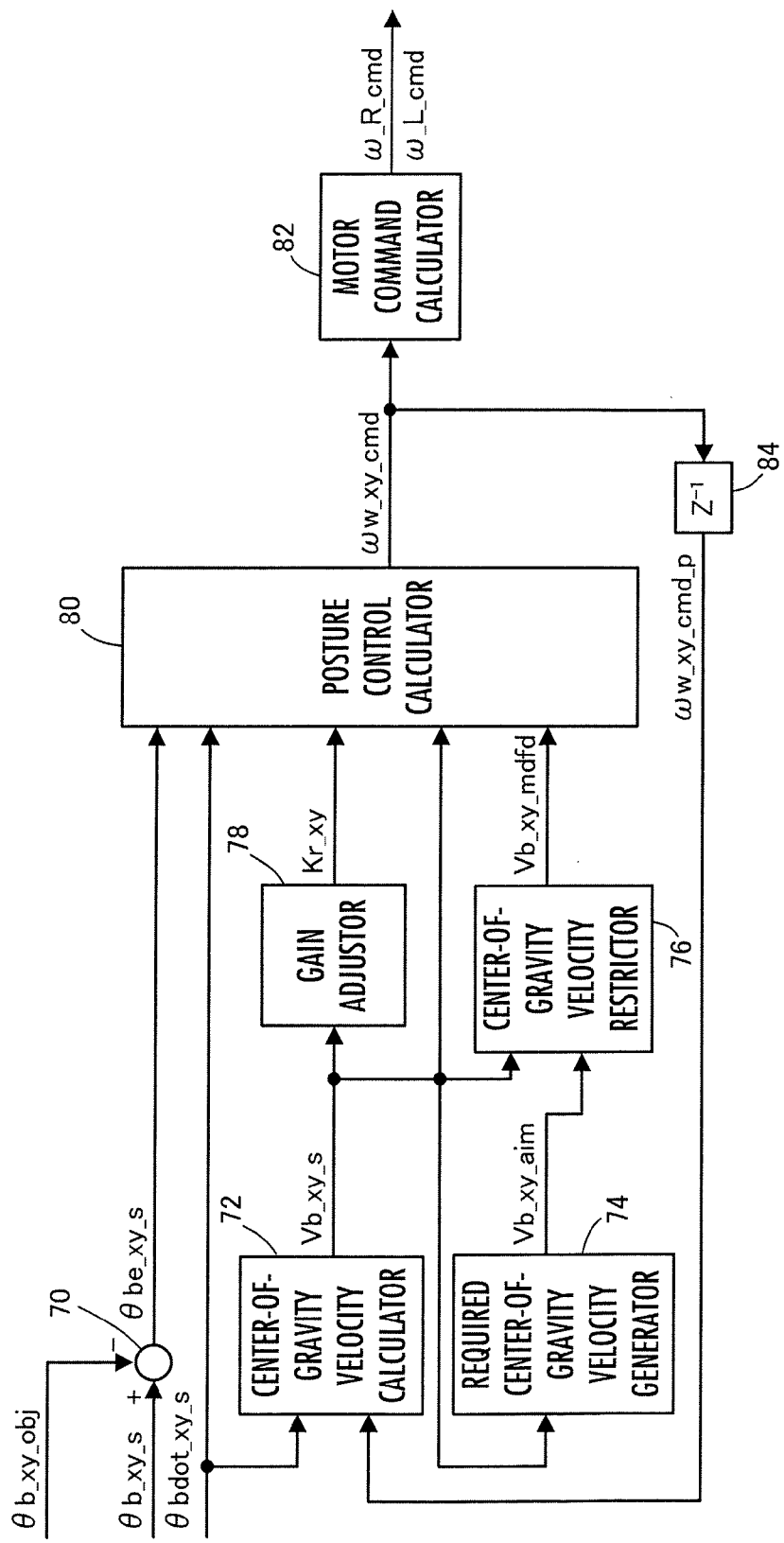
FIG. 9 is a block diagram illustrating a processing function related to the process in STEP 9 of FIG. 7 according to the embodiment.

Reference numeral 84 in FIG. 9 denotes a delay element which receives the imaginary wheel rotational angular velocity command ωw_xy_cmd calculated at each control processing cycle by a posture control calculator 70. The delay element 84 outputs a previous value ωw_xy_cmd_p of the imaginary wheel rotational angular velocity command ωw_xy_cmd at each control processing cycle.

The vehicle control arithmetic process in STEP9 described above is performed by the processing sections as described below.

First, the control unit 50 performs the process by the error calculator 70 and the process by the center-of-gravity velocity calculator 72.

The error calculator 70 receives the base body tilt angle measured values θb_xy_s (θb_x_s and θb_y_s) calculated in the STEP2 and the desired values θb_xy_obj (θb_x_obj and θb_y_obj) set in the STEP5 or STEP7. Then, the error calculator 70 subtracts θb_x_obj from θb_x_s to calculate the base body tilt angle error measured value θbe_x_s (=θb_x_s−θb_x_obj) in the direction about the Y-axis, and also subtracts θb_y_obj from θb_y_s to calculate the base body tilt angle error measured value θbe_y_s (=θb_y_s−θb_y_obj) in the direction about the X-axis.

The process by the error calculator 70 may be performed before the vehicle control arithmetic process in STEP9. For example, the process by the error calculator 70 may be performed during the process in the STEP5 or STEP7.

The center-of-gravity velocity calculator 72 receives the current value of the base body tilt angular velocity measured values θbdot_xy_s (θbdot_x_s and θbdot_y_s) calculated in the STEP2 and also receives the previous value ωw_xy_cmdp of the imaginary wheel velocity command ωw_xy_cmd (ωw_x_cmd_p and ωw_y_cmdp) from the delay element 84. Then, the center-of-gravity velocity calculator 72 calculates an estimated center-of-gravity velocity value Vb_xy_s (Vb_x_s and Vb_y_s) from the above input values according to a predefined arithmetic expression based on the inverted pendulum model.

More specifically, the center-of-gravity velocity calculator 72 calculates Vb_x_s and Vb_y_s according to the following expression 05x and expression 05y, respectively.

$$Vb\_x\_s = Rw\_x \cdot \omega w\_x\_cmd\_p + h\_x \cdot \theta bdot\_x\_s \quad 05x$$

$$Vb\_y\_s = Rw\_y \cdot \omega w\_y\_cmd\_p + h\_y \cdot \theta bdot\_y\_s \quad 05y$$

In the expressions 05x and 05y, Rw_x and Rw_y denote the radii of the imaginary wheels 62_x and 62_y, respectively, as described above, and the values thereof are predefined values set preliminarily. Further, reference characters h_x and h_y denote the heights of the mass points 60_x and 60_y, respectively, of the inverted pendulum model. In the present embodiment, the height of the vehicle system center-of-gravity point is maintained to be substantially constant. Thus, the predefined values set preliminarily are used as the values of h_x and h_y, respectively. Supplementally, the heights h_x and h_y are included in the constant parameters for setting the values in the STEP 6 or STEP 8.

The first term of the right side of the expression 05x given above denotes the moving velocity of the imaginary wheel 62_x in the X-axis direction, which corresponds to the previous value ωw_x_cmdp of the velocity command of the imaginary wheel 62_x. This moving velocity corresponds to the current value of an actual moving velocity of the wheel assembly 5 in the X-axis direction. Further, the second term of the right side of the expression 05x corresponds to the current value of the moving velocity of the vehicle system center-of-gravity point in the X-axis direction attributable to the base body 9 tilting at a tilt angular velocity of θbdot_x_s in the direction about the Y-axis (relative moving velocity in relation to the wheel assembly 5). The same applies to the expression 05y.

Alternatively, the pair of the measured values (the current values) of the rotational angular velocities of the electric motors 31R and 31L, respectively, which are measured on the basis of the outputs of the rotary encoders 56R and 56L, may be converted into the pair of the rotational angular velocities of the imaginary wheels 62_x and 62_y, respectively, then the rotational angular velocities may be used in place of ωw_x_cmdp and ωw_y_cmdp of expressions 05x and 05y. However, in order to eliminate the influences of noises contained in the measured values of the rotational angular velocities, it is advantageous to use ωw_x_cmdp and ωw_y_cmdp, which are desired values.

Subsequently, the control unit 50 performs the process by the required center-of-gravity velocity generator 74 and the process by the gain adjustor 78. In this case, the required center-of-gravity velocity generator 74 and the gain adjustor 78 respectively receive the estimated center-of-gravity velocity values Vb_xy_s (Vb_x_s and Vb_y_s) calculated by the center-of-gravity velocity calculator 72 as described above.

When the operation mode of the vehicle 1 is the boarding mode, the required center-of-gravity velocity generator 74 sets both required center-of-gravity velocities V_x_aim and V_y_aim to zero. On the other hand, when the operation mode of the vehicle 1 is the autonomous mode, as to be described hereinafter, the required center-of-gravity velocity generator 74 sets the required center-of-gravity velocities V_x_aim and V_y_aim variable according to whether it is the moving mode in which the pedestrian or the like moves the vehicle 1 according to the operations on the grip 18 or the halting mode in which the vehicle 1 is at the halting state. As to be described in detail hereinafter, in the moving mode, the required center-of-gravity velocities V_xy_aim (V_x_aim, V_y_aim) are determined according to the external force acting on the grip 18; however, in the halting mode, both required center-of-gravity velocities V_x_aim and V_y_aim are set equal to zero.

Thereafter, the gain adjustor 78 determines the gain adjustment parameters Kr_xy (Kr_x and Kr_y) on the basis of the input estimated center-of-gravity velocity values Vb_xy_s (Vb_x_s and Vb_y_s).

The process performed by the gain adjustor 78 will be described hereinafter with reference to FIG. 10 and FIG. 11.

Figure 10:
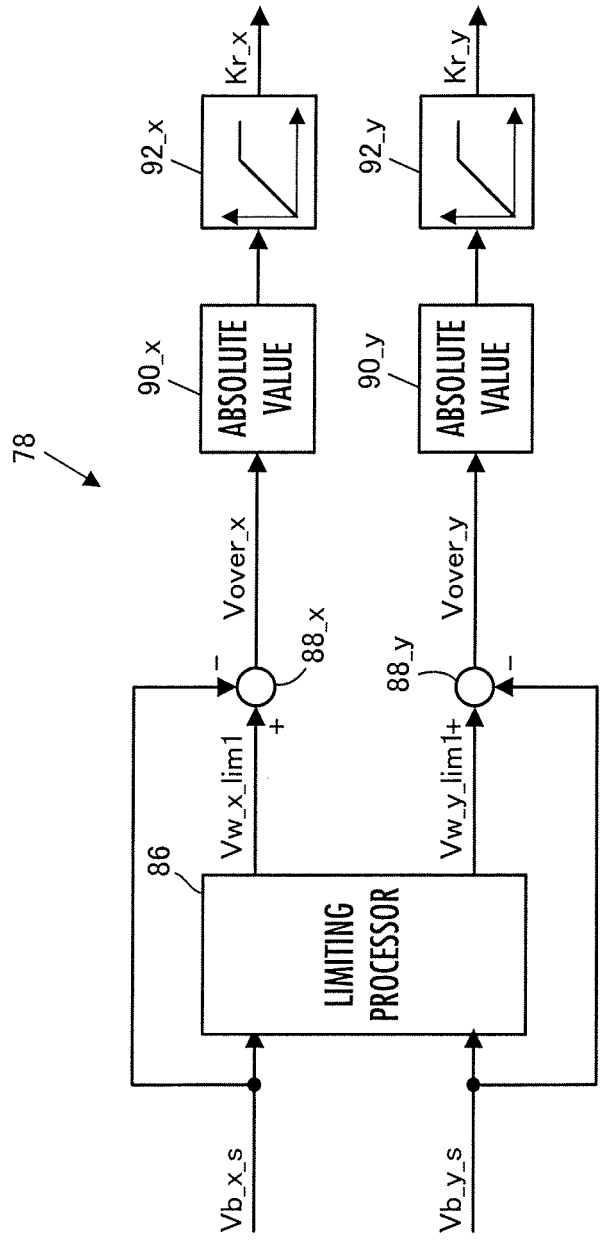
FIG. 10 is a block diagram illustrating a processing function of a gain adjusting element illustrated in FIG. 9.
Figure 11:
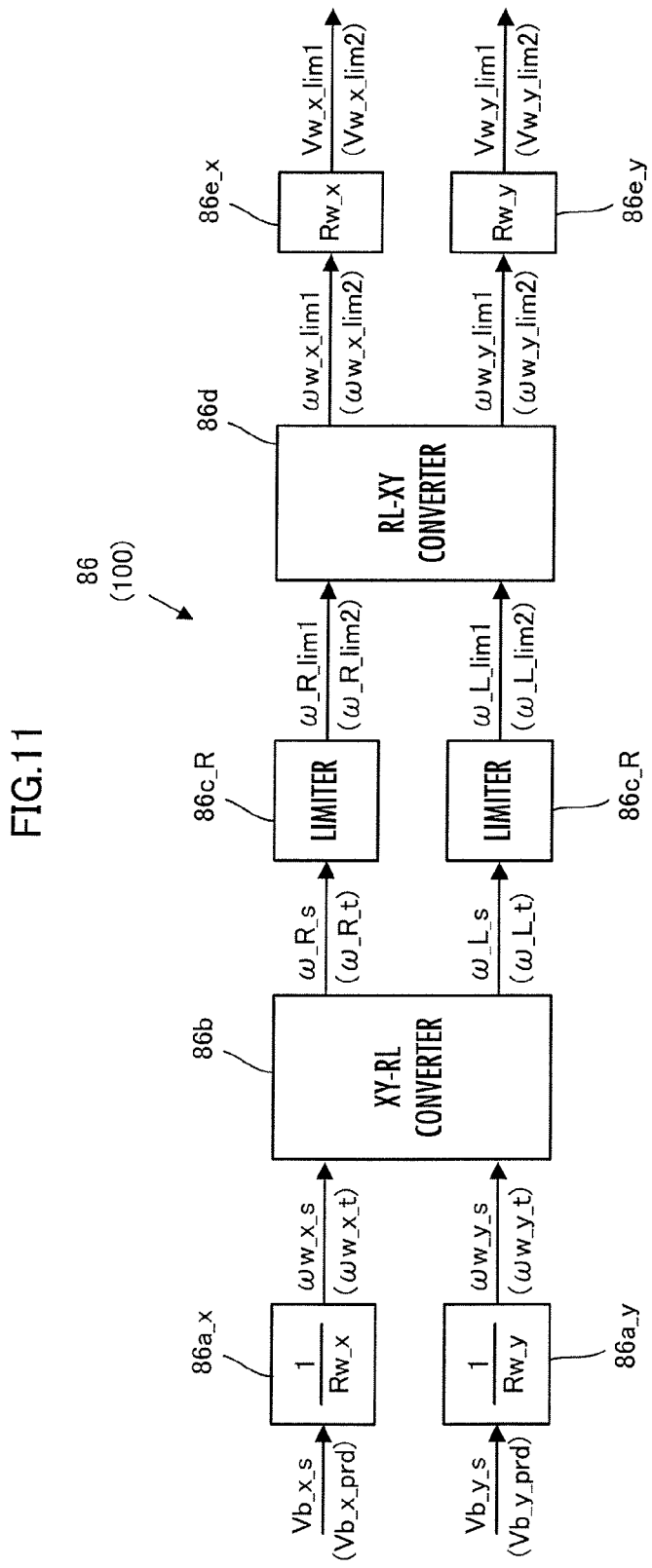
FIG. 11 is a block diagram illustrating a processing function of a limiting processor illustrated in FIG. 10 (or a limiting processor illustrated in FIG. 12)

As illustrated in FIG. 10, the gain adjustor 78 supplies the input estimated center-of-gravity velocity values Vb_x_s and Vb_y_s to a limiting processor 86. The limiting processor 86 adds, as appropriate, restrictions based on the permissible ranges of the rotational angular velocities of the electric motors 31R and 31L to the estimated center-of-gravity velocity values Vb_x_s and Vb_y_s, thereby generating output values Vw_x_lim1 and Vw_y_lim1. The output value Vw_x_lim1 is a value obtained after limiting the moving velocity Vw_x of the imaginary wheel 62_x in the X-axis direction and the output value Vw_y_lim1 is a value obtained after limiting the moving velocity Vw_y of the imaginary wheel 62y in the Y-axis direction.

The process performed by the limiting processor 86 will be described in further detail with reference to FIG. 11. The reference characters in parenthesis in FIG. 11 denote the process performed by a limiting processor 104 of the center-of-gravity velocity restrictor 76, which will be discussed later, and may be ignored in the description related to the process performed by the limiting processor 86.

The limiting processor 86 first supplies the estimated center-of-gravity velocity values Vb_x_s and Vb_y_s to processors 86a_x and 86a_y, respectively. The processor 86a_x divides Vb_x_s by the radius Rw_x of the imaginary wheel 62_x to calculate the rotational angular velocity ωw_x_s of the imaginary wheel 62_x in the case where it is assumed that the moving velocity of the imaginary wheel 62_x in the X-axis direction coincides with Vb_x_s. Similarly, the processor 86a_y calculates the rotational angular velocity ωw_y_s of the imaginary wheel 62_y (=Vb_y_s/Rw_y) in the case where it is assumed that the moving velocity of the imaginary wheel 62_y in the Y-axis direction coincides with Vb_y_s.

Subsequently, the limiting processor 86 converts the pair of ωw_x_s and ωw_y_s into a pair of the rotational angular velocity ω_R_s of the electric motor 31R and the rotational angular velocity ω_L_s of the electric motor 31L by an XY-RL converter 86b.

According to the present embodiment, the conversion is implemented by solving a simultaneous equation obtained by replacing ωw_x, ωw_y, ω_R and ω_L of the expressions 01a and 01b with ωw_x_s, ωw_y_s, ω_R_s and ω_L_s, respectively, taking the ω_R_s and ω_L_s as unknowns.

Subsequently, the limit processor 86 supplies the output values ω_R_s and ω_L_s of the XY-RL converter 86b to limiters 86c_R and 86c_L, respectively. At this time, the limiter 86c_R directly outputs the ω_R_s as an output value ω_R_lim1 if the ω_R_s falls within the permissible range for the right motor, which has an upper limit value (>0) and a lower limit value (<0) of predefined values set beforehand. If the ω_R_s deviates from the permissible range for the right motor, then the limiter 86c_R outputs, as the output value ω_R_lim1, a boundary value of the upper limit value or the lower limit value of the permissible range for the right motor whichever is closer to the ω_R_s. Thus, the output value ω_R_lim1 of the limiter 86c_R is limited to a value within the permissible range for the right motor.

Similarly, the limiter 86c_L directly outputs the ω_L_s as an output value w_L_lim1 if the ω_L_s falls within the permissible range for the left motor, which has an upper limit value (>0) and a lower limit value (<0) of predefined values set beforehand. If the ω_L_s deviates from the permissible range for the left motor, then the limiter 86c_L outputs, as the output value ω_L_lim1, a boundary value of the upper limit value or the lower limit value of the permissible range for the left motor whichever is closer to the ω_L_s. Thus, the output value ω_L_lim1 of the limiter 86c_L is limited to a value within the permissible range for the left motor.

The permissible range for the right motor described above is a permissible range which has been set so as to prevent the rotational angular velocity (absolute value) of the right electric motor 31R from becoming excessively high, and thereby, to prevent the maximum value of the torque that can be output by the electric motor 31R from decreasing. This applies also to the permissible range for the left motor.

Subsequently, the limit processor 86 converts the pair of the output values w_R_lim1 and ω_L_lim1 of the limiters 86c_R and 86c_L, respectively, into a pair of the rotational angular velocities ωw_x_lim1 and ωw_y_lim1 of the imaginary wheels 62_x and 62_y, respectively, by an RL-XY converter 86d.

The conversion is in inverse relation to the conversion process performed by the XY-RL converter 86b. This process is implemented by solving a simultaneous equation obtained by replacing ωw_x, ωw_y, ω_R and ω_L of the expressions 01a and 01b with ωw_x_lim1, ωw_y_lim1, ω_R_lim1 and ω_L_lim1, respectively, taking the ωw_x_lim1 and ωw_y_lim1 as unknowns.

Subsequently, the limit processor 86 supplies the output values ωw_x_lim1 and ωw_y_lim1 of the RL-XY converter 86d to processors 86e_x and 86e_y, respectively. The processor 86e_x multiplies ωw_x_lim1 by the radius Rw_x of the imaginary wheel 62_x to convert ωw_x_lim1 into the moving velocity Vw_x_lim1 of the imaginary wheel 62_x. In the same manner, the processor 86e_y converts ωw_y_lim1 into the moving velocity Vw_y_lim1 of the imaginary wheel 62_y (=ωw_y_lim1·Rw_y).

If it is assumed that the process performed by the limiting processor 86 described above causes the moving velocity Vw_x of the imaginary wheel 62_x in the X-axis direction and the moving velocity Vw_y of the imaginary wheel 62_y in the Y-axis direction to agree with the estimated center-of-gravity velocity values Vb_x_s and Vb_y_s, respectively (in other words, if it is assumed that the moving velocity of the wheel assembly 5 in the X-axis direction and the moving velocity in the Y-axis direction are set to agree with Vb_x_s and Vb_y_s, respectively), then the pair of output values Vw_x_lim1 and Vw_y_lim1 coinciding with Vb_x_s and Vb_y_s, respectively, is output from the limiting processor 86 if the rotational angular velocities ω_R_s and ω_L_s of the electric motors 31R and 31L, respectively, which are required for achieving the moving velocities, both fall within permissible ranges.

Meanwhile, if both or one of the rotational angular velocities ω_R_s and ω_L_s of the electric motors 31R and 31L, respectively, deviates from the permissible range or ranges, then both or one of the rotational angular velocities is forcibly limited to be within the permissible range, and a pair of the moving velocities in the X-axis direction and the Y-axis direction Vw_x_lim1 and Vw_y_lim1 corresponding to a pair of the limited rotational angular velocities ω_R_lim1 and ω_L_lim1 of the electric motors 31R and 31L, respectively, is output from the limiting processor 86.

Hence, the limiting processor 86 generates a pair of output values Vw_x_lim1 and Vw_y_lim1 such that the output values Vw_x_lim1 and Vw_y_lim1 agree with Vb_x_s and Vb_y_s, respectively, as much as possible under an essential required condition that the rotational angular velocities of the electric motors 31R and 31L corresponding to the pair of the output values Vw_x_lim1 and Vw_y_lim1, respectively, do not deviate from the permissible ranges.

Referring back to the description of FIG. 10, the gain adjustor 78 then performs the process by calculators 88_x and 88_y. The calculator 88_x receives the estimated center-of-gravity velocity value in the X-axis direction Vb_x_s and the output value Vw_x_lim1 of the limiting processor 86. Then, the calculator 88_x calculates a value Vover_x obtained by subtracting Vb_x_s from Vw_x_lim1 and outputs the value Vover_x. Further, the calculator 88_y receives the estimated center-of-gravity velocity value in the Y-axis direction Vb_y_s and the output value Vw_y_lim1 of the limiting processor 86. Then, the calculator 88_y calculates a value Vover_y obtained by subtracting Vb_y_s from Vw_y_lim1 and outputs the value Vover_y.

If the output values Vw_x_lim1 and Vw_y_lim1 are not forcibly restricted by the limiting processor 86, then Vw_x_lim1=Vb_x_s and Vw_y_lim1=Vb_y_s. Therefore, the output values Vover_x and Vover_y of the calculators 88_x and 88_y, respectively, will be both zero.

On the other hand, if the output values Vw_x_lim1 and Vw_y_lim1 of the limiting processor 86 are generated by forcibly restricting the input values Vb_x_s and Vb_y_s, then a corrected amount from Vb_x_s of Vw_x_lim1 (=Vw_x_lim1-Vb_x_s) and a corrected amount from Vb_y_s of Vw_y_lim1 (=Vw_y_lim1-Vb_y_s) will be output from the calculators 88_x and 88_y, respectively.

Subsequently, the gain adjustor 78 passes the output value Vover_x of the calculator 88_x through processors 90_x and 92_x in this order thereby to determine the gain adjustment parameter Kr_x. Further, the gain adjustor 78 passes the output value Vover_y of the calculator 88_y through processors 90_y and 92_y in this order thereby to determine the gain adjustment parameter Kr_y. The gain adjustment parameters Kr_x and Kr_y both take values within the range from 0 to 1.

The processor 90_x calculates and outputs the absolute value of the input Vover_x. Further, the processor 92_x generates Kr_x such that the output value Kr_x monotonously increases relative to an input value |Vover_x| and has a saturation characteristic. The saturation characteristic means that if the input value increases to a certain level, then a change amount of an output value relative to an increase in the input value becomes zero or approaches to zero.

According to the present embodiment, if the input value |Vover_x| is a preset, predefined value or less, then the processor 92_x outputs, as Kr_x, a value obtained by multiplying the input value |Vover_x| by a proportionality coefficient of a predefined value. Further, if the input value |Vover_x| is larger than the predefined value, then the processor 92_x outputs 1 as Kr_x. The proportionality coefficient is set such that the product of |Vover_x| and the proportionality coefficient becomes 1 when |Vover_x| agrees with a predefined value.

The process performed by processors 90_y and 92_y is the same as that performed by the processors 90_x and 92_x, respectively, described above.

If the output values Vw_x_lim1 and Vw_y_lim1 in the limiting processor 86 are not forcibly restricted by the process performed by the gain adjustor 78 described above, that is, if the rotational angular velocities of the electric motors 31R and 31L fall within the permissible ranges even when the electric motors 31R and 31L are operated such that the moving velocities Vw_x and Vw_y of the wheel assembly 5 in the X-axis direction and the Y-axis direction, respectively, agree with the estimated center-of-gravity velocity values Vb_x_s and Vb_y_s, respectively, then the gain adjustment parameters Kr_x and Kr_y are both determined to be 0.

On the other hand, if the output values Vw_x_lim1 and Vw_y_lim1 of the limiting processor 86 are generated by forcibly restricting the input values Vb_x_s and Vb_y_s, that is, if the rotational angular velocity of one of the electric motors 31R and 31L deviates from the permissible range (if the absolute value of one of the rotational angular velocities becomes excessively high) when the electric motors 31R and 31L are operated such that the moving velocities Vw_x and Vw_y of the wheel assembly 5 in the X-axis direction and the Y-axis direction, respectively, agree with the estimated center-of-gravity velocity values Vb_x_s and Vb_y_s, then the values of the gain adjustment parameters Kr_x and Kr_y are determined on the basis of the absolute values of the corrected amounts Vover_x and Vover_y, respectively. In this case, Kr_x is determined to be a larger value as the absolute value of the corrected amount Vx_over increases, the upper limit value thereof being 1. The same applies to Kr_y.

Returning to the description of FIG. 9, after performing the process by the center-of-gravity velocity calculator 72 and the process by the required center-of-gravity velocity generator 74 as described above, the control unit 50 performs the process by the center-of-gravity velocity restrictor 76.

The center-of-gravity velocity restrictor 76 receives the estimated center-of-gravity velocities Vb_xy_s (Vb_x_s and Vb_y_s) calculated by the center-of-gravity velocity calculator 72 and the required center-of-gravity velocities Vb_xy_aim (Vb_x_aim and Vb_y_aim) determined by the required center-of-gravity velocity generator 74. Then, the center-of-gravity velocity restrictor 76 performs the process illustrated by the block diagram of FIG. 12 by using the above input values so as to determine desired center-of-gravity velocities for control Vb_xy_mdfd (Vb_x_mdfd and Vb_y_mdfd).

Specifically, the center-of-gravity velocity restrictor 76 first performs the process by stead-state error calculators 94_x and 94_y.

In this case, the stead-state error calculator 94_x receives the estimated center-of-gravity velocity value in the X-axis direction Vb_x_s and also receives the previous value Vb_x_mdfd_p of the desired center-of-gravity velocity for control in the X-axis direction Vb_x_mdfd through the intermediary of a delay element 96_x. Then, in the stead-state error calculator 94_x, first, the input Vb_x_s is supplied to a proportional-differential compensation component (PD compensation component) 94a_x. The proportional-differential compensation component 94_x is a compensation component whose transfer function is denoted by 1+Kd·S, and adds the input Vb_x_s and the value obtained by multiplying the differential value thereof (temporal change rate) by a coefficient Kd of a predefined value, and outputs the value resulting from the addition.

Subsequently, the stead-state error calculator 94_x calculates, by a calculator 94b_x, the value obtained by subtracting the input Vb_x_mdfd_p from the output value of the proportional-differential compensation component 94_x, then supplies the output value of the calculator 94b_x to a low-pass filter 94c_x having a phase compensation function. The low-pass filter 94c_x is a filter whose transfer function is denoted by (1+T2·S)/(1+T1·S). Then, the stead-state error calculator 94_x outputs the output value Vb_x_prd of the low-pass filter 94c_x.

The stead-state error calculator 94_y receives the estimated center-of-gravity velocity value in the Y-axis direction Vb_y_s and also receives the previous value Vb_y_mdfd_p of the desired center-of-gravity velocity for control in the Y-axis direction Vb_y_mdfd through the intermediary of a delay element 96_y.

Then, similar to the stead-state error calculator 94_x described above, the stead-state error calculator 94_y performs the process by a proportional-differential compensation component 94a_y, a calculator 94b_y, and a low-pass filter 94c_y in order and outputs an output value Vb_y_prd of the low-pass filter 94c_y.

Here, the output value Vb_x_prd of the stead-state error calculator 94_x may be used as a stead-state error of a future estimated center-of-gravity velocity value in the X-axis direction presumed from a current motion state of the vehicle system center-of-gravity point observed from the Y-axis direction (in other words, the motion state of the mass point 60_x of the inverted pendulum model observed from the Y-axis direction) relative to the desired center-of-gravity velocity for control Vb_x_mdfd of an expected convergence value. Similarly, the output value Vb_y_prd of the stead-state error calculator 94_y may be used as a stead-state error of a future estimated center-of-gravity velocity value in the Y-axis direction presumed from a current motion state of the vehicle system center-of-gravity point observed from the X-axis direction (in other words, the motion state of the mass point 60_y of the inverted pendulum model observed from the X-axis direction) relative to the desired center-of-gravity velocity for control Vb_y_mdfd of an expected convergence value. Hereinafter, the output values Vb_x_prd and Vb_y_prd of the stead-state error calculators 94_x and 94_y, respectively, will be referred to as the expected center-of-gravity velocity stead-state error values.

After performing the process by the stead-state error calculators 94_x and 94_y as described above, the center-of-gravity velocity restrictor 76 performs the process for adding the required center-of-gravity velocity Vb_x_aim to the output value Vb_x_prd of the stead-state error calculator 94_x and the process for adding the required center-of-gravity velocity Vb_y_aim to the output value Vb_y_prd of the stead-state error calculator 94_y by calculators 98_x and 98_y, respectively.

Therefore, an output value Vb_x_t of the calculator 98_x will indicate the velocity obtained by adding the required center-of-gravity velocity Vb_x_aim in the X-axis direction to the expected center-of-gravity velocity stead-state error value in the X-axis direction Vb_x_prd. Similarly, an output value Vb_y_t of the calculator 98_y will indicate the velocity obtained by adding the required center-of-gravity velocity Vb_y_aim in the Y-axis direction to the expected center-of-gravity velocity stead-state error value in the Y-axis direction Vb_y_prd.

If the required center-of-gravity velocity in the X-axis direction Vb_x_aim is zero, as in the case where, for example, the operation mode of the vehicle 1 is the autonomous mode or the boarding mode, then the expected center-of-gravity velocity stead-state error value in the X-axis direction Vb_x_prd is directly provided as the output value Vb_x_t of the calculator 98_x. Similarly, if the required center-of-gravity velocity in the Y-axis direction Vb_y_aim is zero, then the expected center-of-gravity velocity stead-state error value in the Y-axis direction Vb_y_prd is directly provided as the output value Vb_y_t of the calculator 98_y.

Subsequently, the center-of-gravity velocity restrictor 76 supplies the output values Vb_x_t and Vb_y_t of the calculators 98_x and 98_y, respectively, to a limiting processor 100. The process by the limiting processor 100 is the same as the process by the limiting processor 86 of the gain adjustor 78 described above. In this case, as indicated by the reference characters in parenthesis in FIG. 11, only the input values and the output values of the individual processing sections of the limiting processor 100 are different from those of the limiting processor 86.

Specifically, in the limiting processor 100, rotational angular velocities ωw_x_t and ωw_y_t of the imaginary wheels 62_x and 62_y in the case where it is assumed that the moving velocities Vw_x and Vw_y of the imaginary wheels 62_x and 62_y, respectively, coincide with Vb_x_t and Vb_y_t, respectively, are calculated by the processors 86a_x and 86a_y, respectively. Then, the pair of the rotational angular velocities ωw_x_t and ωw_y_t is converted into the pair of the rotational angular velocities ω_R_t and ω_L_t of the electric motors 31R and 31L by the XY-RL converter 86b.

Thereafter, the rotational angular velocities ω_R_t and ω_L_t are limited to values within the permissible range for the right motor and the permissible range for the left motor, respectively, by limiters 86c_R and 86c_L. After the limitation process, the processed values ω_R_lim2 and ω_L_lim2 are converted by the RL-XY converter 86d into the rotational angular velocities ωw_x_lim2 and ωw_y_lim2 of the imaginary wheels 62_x and 62_y.

Subsequently, the moving velocities Vw_x_lim2 and Vw_y_lim2 of the imaginary wheels 62_x and 62_y corresponding respectively to the rotational angular velocities ωw_x_lim2 and ωw_y_lim2 are calculated by the processors 86e_x and 86e_y, respectively, and the calculated moving velocities Vw_x_lim2 and Vw_y_lim2 are output from the limiting processor 100.

Similar to the limiting processor 86, according to the process performed by the limiting processor 100, the limiting processor 100 generates a pair of output values Vw_x_lim2 and Vw_y_lim2 such that the output values Vw_x_lim2 and Vw_y_lim2 agree with Vb_x_t and Vb_y_t, respectively, as much as possible under an essential required condition that the rotational angular velocities of the electric motors 31R and 31L corresponding to the pair of the output values Vw_x_lim2 and Vw_y_lim2, respectively, do not deviate from the permissible ranges.

The permissible ranges for the right motor and left motor in the limiting processor 100 do not have to be the same as the permissible ranges in the limiting processor 86, and the permissible ranges may be different from each other.

Figure 12:
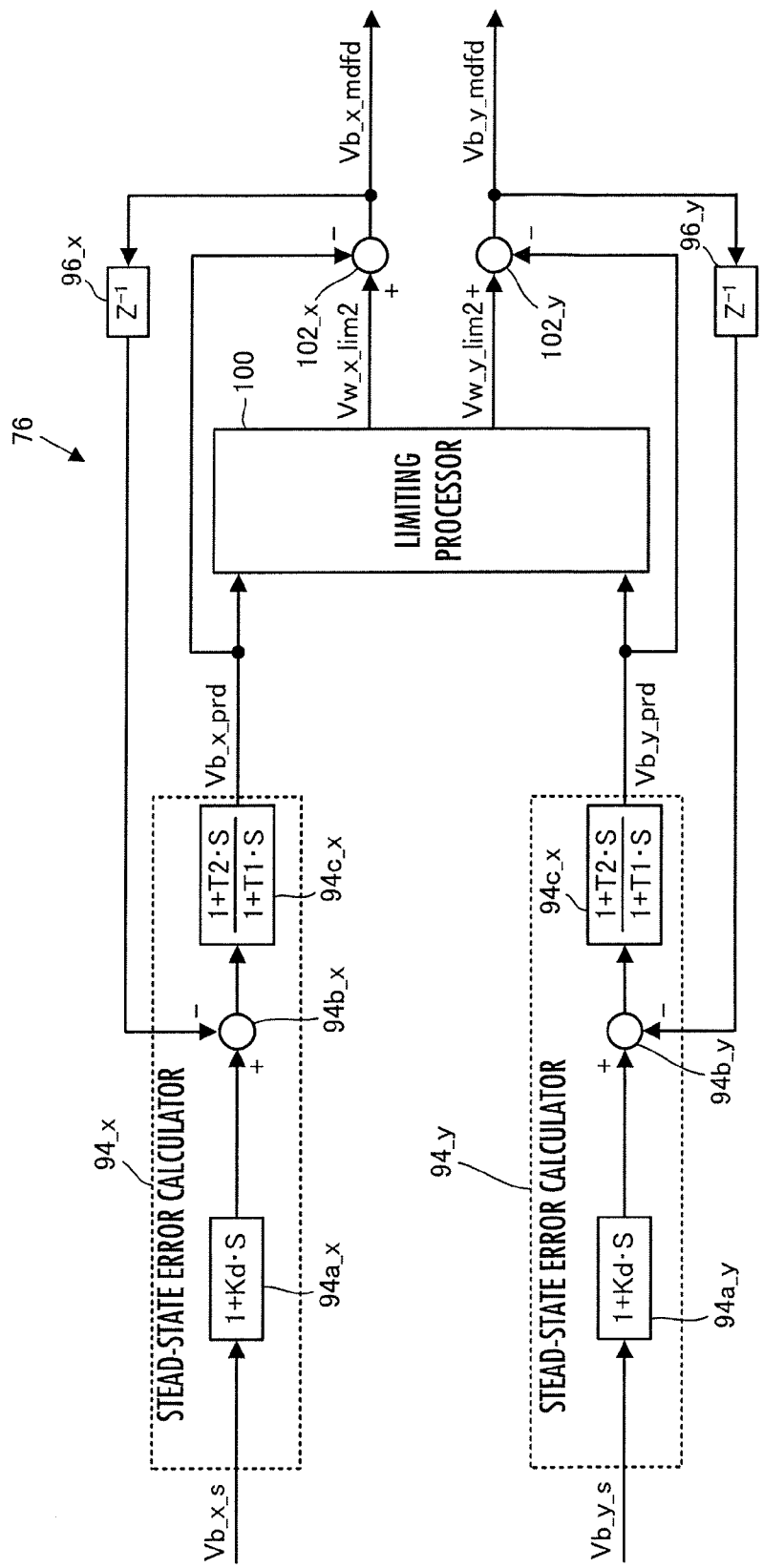
FIG. 12 is a block diagram illustrating a processing function of a center-of-gravity velocity restrictor 76 illustrated in FIG. 9.

Referring back to the description of FIG. 12, the center-of-gravity velocity restrictor 76 then performs the process by calculators 102_x and 102_y to calculate the desired center-of-gravity velocities for control Vb_x_mdfd and Vb_y_mdfd, respectively. Specifically, the calculator 102_x calculates a value, which is obtained by subtracting the expected center-of-gravity velocity stead-state error value in the X-axis direction Vb_x_prd from the output value Vw_x_lim2 of the limiting processor 100, as the desired center-of-gravity velocity for control in the X-axis direction Vb_x_mdfd. Similarly, the calculator 102_y calculates a value, which is obtained by subtracting the expected center-of-gravity velocity stead-state error value in the Y-axis direction Vb_y_prd from the output value Vw_y_lim2 of the limiting processor 100, as the desired center-of-gravity velocity for control in the Y-axis direction Vb_y_mdfd.

Regarding the desired center-of-gravity velocities for control Vb_x_mdfd and Vb_y_mdfd determined as described above, in the case where the output values V_x_lim2 and V_y_lim2 are not forcibly restricted by the limiting processor 100, that is, in the case where the rotational angular velocities of the electric motors 31R and 31L fall within the permissible ranges even when the electric motors 31R and 31L are operated such that the moving velocities of the wheel assembly 5 in the X-axis direction and the Y-axis direction, respectively, agree with the output value Vb_x_t of the calculator 98_x and Vb_y_t of the calculator 98_y, respectively, the required center-of-gravity velocities Vb_x_aim and Vb_y_aim will be directly determined as the desired center-of-gravity velocities for control Vb_x_mdfd and Vb_y_mdfd, respectively.

In this case, if the required center-of-gravity velocity in the X-axis direction Vb_x_aim is zero, then the desired center-of-gravity velocity for control in the X-axis direction Vb_x_mdfd will be also zero, and if the required center-of-gravity velocity in the Y-axis direction Vb_y_aim is zero, then the desired center-of-gravity velocity for control in the Y-axis direction Vb_y_mdfd will be also zero.

Meanwhile, if the output values Vw_x_lim2 and Vw_y_lim2 of the limiting processor 100 are generated by forcibly restricting the input values Vb_x_t and Vb_y_t, that is, if the rotational angular velocity of one of the electric motors 31R and 31L deviates from the permissible range (if the absolute value of one of the rotational angular velocities becomes excessively high) when the electric motors 31R and 31L are operated such that the moving velocities of the wheel assembly 5 in the X-axis direction and the Y-axis direction, respectively, agree with the output value Vb_x_t of the calculator 98_x and the output value Vb_y_t of the calculator 98_y, then for the X-axis direction, a value obtained by correcting the required center-of-gravity velocity Vb_x_aim by a correction amount from the input value Vb_x_t of the output value Vw_x_lim2 of the limiting processor 100 (=Vw_x_lim2−Vb_x_t) (a value obtained by adding the correction amount to Vb_x_aim) is determined as the desired center-of-gravity velocity for control in the X-axis direction Vb_x_mdfd.

Further, regarding the Y-axis direction, a value obtained by correcting the required center-of-gravity velocity Vb_y_aim by a correction amount from the input value Vb_y_t of the output value Vw_y_lim2 of the limiting processor 100 (=Vw_y_lim2−Vb_y_t)(a value obtained by adding the correction amount to Vb_y_aim) is determined as the desired center-of-gravity velocity for control in the Y-axis direction Vb_y_mdfd.

In this case, if the required center-of-gravity velocity Vb_x_aim on, for example, the velocity in the X-axis direction is not zero, then the desired center-of-gravity velocity for control Vb_x_mdfd approaches to zero more than the required center-of-gravity velocity Vb_x_aim or becomes a velocity in the opposite direction from the required center-of-gravity velocity Vb_x_aim. Further, if the required center-of-gravity velocity Vb_x_aim is zero, then the desired center-of-gravity velocity for control Vb_x_mdfd becomes a velocity in the opposite direction from the expected center-of-gravity velocity stead-state error value in the X-axis direction Vb_x_prd output by the stead-state error calculator 94_x. The same applies to the velocity in the Y-axis direction.

The above has described the process by the center-of-gravity velocity restrictor 76.

Returning to the description of FIG. 9, after performing the processes by the center-of-gravity velocity calculator 72, the center-of-gravity velocity restrictor 76, the gain adjustor 78, and the error calculator 70, respectively, as described above, the control unit 50 performs the process by the posture control calculator 80.

Figure 13:
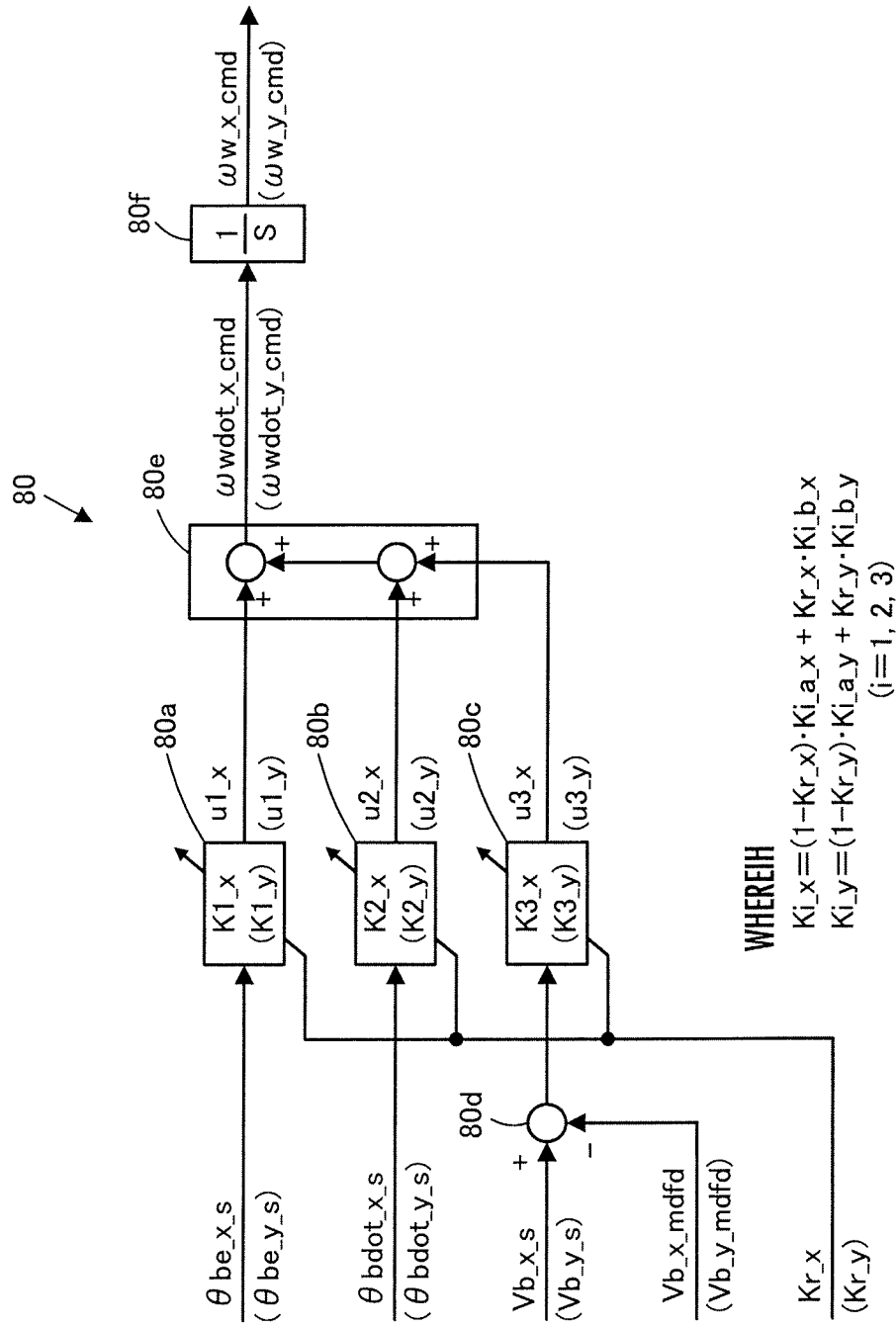
FIG. 13 is a block diagram illustrating a processing function of a posture control calculator 80 illustrated in FIG. 9.

The process by the posture control calculator 80 will be described below with reference to FIG. 13. The reference characters without parenthesis in FIG. 13 are the reference characters related to the processing for determining the imaginary wheel rotational angular velocity command ωw_x_cmd, which is the desired value of the rotational angular velocity of the imaginary wheel 62_x circumrotating in the X-axis direction. The reference characters in parenthesis are the reference characters related to the processing for determining the imaginary wheel rotational angular velocity command ωw_y_cmd, which is the desired value of the rotational angular velocity of the imaginary wheel 62_y circumrotating in the Y-axis direction.

The posture control calculator 80 receives the base body tilt angle error measured value θbe_xy_s calculated by the error calculator 70, the base body tilt angular velocity measured values θbdot_xy_s calculated in the STEP2, the estimated center-of-gravity velocity values Vb_xy_s calculated by the center-of-gravity velocity calculator 72, the desired center-of-gravity velocities for control Vb_xy_mdfd calculated by the center-of-gravity velocity restrictor 76, and the gain adjustment parameters Kr_xy calculated by the gain adjustor 78.

Then, the posture control calculator 80 first calculates the imaginary wheel rotational angular acceleration commands ωwdot_xy_cmd according to the following expressions 07x and 07y by using the above received values.

$$\omega wdot\_x\_cmd = K1\_x \cdot \theta be\_x\_s + K2\_x \cdot \theta bdot\_x\_s + K3\_x \cdot (Vb\_x\_s - Vb\_x\_mdfd) \quad \text{Expression 07x}$$

$$\omega wdot\_y\_cmd = K1\_y \cdot \theta be\_y\_s + K2\_y \cdot \theta bdot\_y\_s + K3\_y \cdot (Vb\_y\_s - Vb\_y\_mdfd) \quad \text{Expression 07y}$$

Hence, according to the present embodiment, the imaginary wheel rotational angular acceleration command ωwdot_x_cmd denoting the manipulated variable (control input) for controlling the motion of the mass point 60_x of the inverted pendulum model observed from the Y-axis direction (i.e., the motion of the vehicle system center-of-gravity point observed from the Y-axis direction), and the imaginary wheel rotational angular acceleration command ωwdot_y_cmd denoting the manipulated variable (control input) for controlling the motion of the mass point 60_y of the inverted pendulum model observed from the X-axis direction (i.e., the motion of the vehicle system center-of-gravity point observed from the X-axis direction) are determined by adding up three manipulated variable components (the three terms of the right side of each of expressions 07x and 07y).

The gain coefficients K1_x and K2_y in these expressions 07x and 07y may be used as the feedback gains related to the tilt angle of the base body 9 (or the seat 3), the gain coefficients K2_x and K2_y mean the feedback gains related to the tilt angular velocity (the temporal change rate of a tilt angle) of the base body 9 (or the seat 3), and the gain coefficients K3_x and K3_y may be used as the feedback gains related to the moving velocity of the vehicle system center-of-gravity point (a predefined representative point of the vehicle 1).

The gain coefficients K1_x, K2_x, and K3_x related to the manipulated variable components in expression 07x are variably set on the basis of the gain adjustment parameter Kr_x, while the gain coefficients K1_y, K2_y, and K3_y related to the manipulated variable components in expression 07y are variably set on the basis of the gain adjustment parameter Kr_y. Hereinafter, the gain coefficients K1_x, K2_x, and K3_x in expression 07x may be referred to as the first gain coefficient K1_x, the second gain coefficient K2_x, and the third gain coefficient K3_x, respectively. The same applies to the gain coefficients K1_y, K2_y, and K3_y in expression 07y.

An i-th gain coefficient Ki_x (i=1, 2, or 3) in the expression 07x and an i-th gain coefficient Ki_y (i=1, 2, or 3) in the expression 07y are determined on the basis of the gain adjustment parameters Kr_x and Kr_y according to expressions 09x and 09y given below, as indicated by the notations in FIG. 13.

$$Ki\_x = (1 - Kr\_x) \cdot Ki\_a\_x + Kr\_x \cdot Ki\_b\_x \quad \text{Expression 09x}$$

$$Ki\_y = (1 - Kr\_y) \cdot Ki\_a\_y + Kr\_y \cdot Ki\_b\_y \quad \text{Expression 09y}$$

(i=1, 2, 3)

Wherein, Ki_a_x and Ki_b_x in the expression 09x denote constant values set preliminarily as the gain coefficient values on a minimum end (an end close to zero) of the i-th gain coefficient Ki_x and as the gain coefficient value on a maximum end (an end away from zero), respectively. The same applies to Ki_a_y and Ki_b_y in the expression 09y.

Thus, each i-th gain coefficient Ki_x (i=1, 2 or 3) used for the calculation in the expression 07x is determined as a weighted mean value of the constant values Ki_a_x and Ki_b_x corresponding thereto. Further, in this case, the weight applied to each of Ki_a_x and Ki_b_x is changed according to the gain adjustment parameter Kr_x. Therefore, if Kr_x=0, then Ki_x=Ki_a_x, and if Kr_x=1, then Ki_x=Ki_b_x. As Kr_x approaches from 0 to 1, the i-th gain coefficient Ki_x approaches from Ki_a_x to Ki_b_x.

Similarly, each i-th gain coefficient Ki_y (i=1, 2 or 3) used for the calculation in the expression 07y is determined as a weighted mean value of the constant values Ki_a_y and Ki_b_y corresponding thereto. Further, in this case, the weight applied to each of Ki_a_y and Ki_b_y is changed according to the gain adjustment parameter Kr_y. Therefore, as with the case of Ki_x, as the value of Kr_y changes from 0 to 1, the value of the i-th gain coefficient Ki_y changes between Ki_a_y and Ki_b_y.

Supplementally, the constant values Ki_a_x, Ki_b_x and Ki_a_y, Ki_b_y (i=1, 2 or 3) are included in the constant parameters, the values of which are set in the STEP 6 or STEP 8.

The posture control calculator 80 uses the first to the third gain coefficients K1_$x$, K2_$x$, and K3_$x$ determined as described above to perform the calculation of the above expression 07x, thereby calculating the imaginary wheel rotational angular acceleration command ωwdot_x_cmd related to the imaginary wheel 62_$x$ circumrotating in the X-axis direction.

More specifically, referring to FIG. 13, the posture control calculator 80 calculates a manipulated variable component u1_x obtained by multiplying the base body tilt angle error measured value θbe_x_s by the first gain coefficient K1_$x$ and a manipulated variable component u2_$x$ obtained by multiplying the base body tilt angular velocity measured value θbdot_x_s by the second gain coefficient K2_$x$ by processors 80$a$ and 80$b$, respectively. Further, the posture control calculator 80 calculates the difference between the estimated center-of-gravity velocity value Vb_x_s and the desired center-of-gravity velocity for control Vb_x_mdfd (=Vb_x_s-Vb_x_mdfd) by a calculator 80$d$, and calculates, by a processor 80$c$, a manipulated variable component u3_x obtained by multiplying the calculated difference by the third gain coefficient K3_$x$. Then, the posture control calculator 80 adds up these manipulated variable components u1_x, u2_$x$, and u3_x by a calculator 80$e$ so as to calculate the imaginary wheel rotational angular acceleration command ωwdot_x_cmd.

Similarly, the posture control calculator 80 performs the calculation according to the expression 07y by using the first to the third gain coefficients K1_y, K2_$y$, and K3_y determined as described above, thereby calculating the imaginary wheel rotational angular acceleration command ωwdot_y_cmd related to the imaginary wheel 62_$y$ circumrotating in the Y-axis direction.

More specifically, the posture control calculator 80 calculates a manipulated variable component u1_y in the processor 80$a$ by multiplying the base body tilt angle error measured value θbe_y_s by the first gain coefficient K1_y and a manipulated variable component u2_$y$ in the processor 80$b$ by multiplying the base body tilt angular velocity measured value θbdot_y_s by the second gain coefficient K2_$y$. Further, the posture control calculator 80 calculates the difference between the estimated center-of-gravity velocity value Vb_y_s and the desired center-of-gravity velocity for control Vb_y_mdfd (=Vb_y_s-Vb_y_mdfd) in the calculator 80$d$, and thereafter, calculates a manipulated variable component u3_y in the processor 80$c$ by multiplying the calculated difference by the third gain coefficient K3_y. Then, the posture control calculator 80 adds up these manipulated variable components u1_y, u2_$y$, and u3_y in the calculator 80$e$ so as to calculate the imaginary wheel rotational angular acceleration command ωwdot_x_cmd.

At the right side of the expression 07x, the first term (=the first manipulated variable component u1_x) and the second term (=the second manipulated variable component u2_$x$) denote the feedback manipulated variable components for converging the base body tilt angle error measured value θbe_x_s in the direction about the X-axis to zero (converging the base body tilt angle measured value θb_x_s to the desired value θb_x_obj) by the PD law (proportional-differential law) serving as the feedback control law.

Further, at the right side of the expression 07x, the third term (=the third manipulated variable component u3_x) denotes a feedback manipulated variable component for converging the difference between the estimated center-of-gravity velocity value Vb_x_s and the desired center-of-gravity velocity for control Vb_x_mdfd to zero (converging Vb_x_s to Vb_x_mdfd) by a proportional law serving as the feedback control law.

The same applies to the first to the third terms (the first to the third manipulated variable components u1_y, u2_$y$, and u3_y) of the right side of the expression 07y.

After the calculation of the imaginary wheel rotational angular acceleration commands ωwdot_x_cmd and ωwdot_y_cmd as described above, the posture control calculator 80 integrates the ωwdot_x_cmd and ωwdot_y_cmd by an integrator 80$f$ thereby to determine the imaginary wheel rotational velocity commands ωw_x_cmd and ωw_y_cmd.

The above has described the details of the process performed by the posture control calculator 80.

Supplementally, the imaginary wheel rotational angular acceleration command ωwdot_x_cmd may alternatively be calculated by an expression wherein the third term of the right side of the expression 07x is separated into the manipulated variable component based on Vb_x_s (=K3_$x$·Vb_x_s) and the manipulated variable component based on Vb_x_mdfd (=−K3_$x$·Vb_x_mdfd). Similarly, the imaginary wheel rotational angular acceleration command ωwdot_y_cmd may alternatively be calculated by an expression wherein the third term of the right side of expression 07y is separated into the manipulated variable component based on Vb_y_s (=K3_y·Vb_y_s) and the manipulated variable component based on Vb_y_mdfd (=−K3_y·Vb_y_mdfd).

Further, in the present embodiment, the rotational angular acceleration commands ωw_x_cmd and ωw_y_cmd of the imaginary wheels 62_$x$ and 62_$y$ have been used as the manipulated variables (control inputs) for controlling the behaviors of the vehicle system center-of-gravity point. However, for example, the drive torques of the imaginary wheels 62_$x$ and 62_$y$ or the translational forces obtained by dividing the driving torques by the radii Rw_x and Rw_y of the imaginary wheels 62_$x$ and 62_$y$ (i.e., the frictional forces between the imaginary wheels 62_$x$, 62_$y$ and a floor surface) may be used as the manipulated variables.

Returning to the description of FIG. 9, the control unit 50 then supplies the imaginary wheel rotational velocity commands ωw_x_cmd and ωw_y_cmd determined as described above by the posture control calculator 80 to the motor command calculator 82, and performs the processing by the motor command calculator 82 so as to determine a velocity command ω_R_cmd of the electric motor 31R and a velocity command ω_L_cmd of the electric motor 31L. The processing by the motor command calculator 82 is the same as the processing by the XY-RL converter 86$b$ of the limiting processor 86 (refer to FIG. 11).

To be more specific, the motor command calculator 82 determines the velocity commands ω_R_cmd and ω_L_cmd of the electric motors 31R and 31L by solving a simultaneous equation obtained by replacing $\omega w\_x$, $\omega w\_y$, $\omega\_R$ and $\omega\_L$ of the abovementioned expressions 01a and 01b by $\omega w\_x\_cmd$, $\omega w\_y\_cmd$, $\omega\_R\_cmd$ and $\omega\_L\_cmd$, respectively, with the $\omega\_R\_cmd$ and $\omega\_L\_cmd$ serving as unknowns.

Thus, the vehicle control arithmetic process in the STEP 9 is completed.

By the control arithmetic processing carried out by the control unit 50 as described above, the imaginary wheel rotational angular acceleration commands $\omega dot\_xy\_cmd$ denoting the manipulated variables (control inputs) are determined such that, basically, the posture of the base body 9 is maintained at a posture in which the base body tilt angle error measured value $\theta be\_x\_s$ and $\theta be\_y\_s$ are both zero (hereinafter, this posture will be referred to as the basic posture), i.e., the position of the vehicle system center-of-gravity point (the vehicle-occupant overall center-of-gravity point or the vehicle-alone center-of-gravity point) is maintained to be substantially right above the ground contact surface of the wheel assembly 5, in the operation modes of both the boarding mode and the autonomous mode. Specifically, the imaginary wheel rotational angular acceleration command $\omega dot\_xy\_cmd$ is determined such that the estimated center-of-gravity velocity values $Vb\_xy\_s$ as the estimated values of the moving velocities of the vehicle system center-of-gravity point is converged to the desired center-of-gravity velocities for control $Vb\_xy\_mdfd$ while maintaining the posture of the base body 9 at the basic posture. If the vehicle is in the boarding mode and in the halting mode of the autonomous mode, the desired center-of-gravity velocities for control $Vb\_xy\_mdfd$ are equal to zero. Thereby, the imaginary wheel rotational angular acceleration command $\omega dot\_xy\_cmd$ will be determined such that the vehicle system center-of-gravity point is substantially stationary while maintaining the posture of the base body 9 at the basic posture.

Then, the rotational angular velocities of the electric motors 31R and 31L, respectively, obtained by converting the imaginary wheel rotational angular velocity commands $\omega w\_xy\_cmd$, which is obtained by integrating each component of $\omega dot\_xy\_cmd$, are determined as the velocity commands $\omega\_R\_cmd$ and $\omega\_L\_cmd$ of the electric motors 31R and 31L. Further, the rotational velocities of the electric motors 31R and 31L are controlled according to the velocity commands $\omega\_R\_cmd$ and $\omega\_L\_cmd$. Thus, the moving velocities of the wheel assembly 5 in the X-axis direction and the Y-axis direction, respectively, are controlled so as to agree with the moving velocity of the imaginary wheel 62_*x* corresponding to $\omega w\_x\_cmd$ and the moving velocity of the imaginary wheel 62_*y* corresponding to $\omega w\_y\_cmd$, respectively.

Accordingly, if, for example, the actual base body tilt angle $\theta b\_x$ deviates from the desired value $\theta b\_x\_obj$ in the direction about the Y-axis by leaning forward, then the wheel assembly 5 moves forward to eliminate the deviation (to converge $\theta be\_x\_s$ to zero). Similarly, if the actual $\theta b\_x$ deviates from the desired value $\theta b\_x\_obj$ by leaning backward, then the wheel assembly 5 moves backward to eliminate the deviation (to converge $\theta be\_x\_s$ to zero).

If, for example, the actual base body tilt angle $\theta b\_y$ deviates from the desired value $\theta b\_y\_obj$ in the direction about the X-axis by leaning rightward, then the wheel assembly 5 moves rightward to eliminate the deviation (to converge $\theta be\_y\_s$ to zero). Similarly, if the actual $\theta b\_y$ deviates from the desired value $\theta b\_y\_obj$ by leaning leftward, then the wheel assembly 5 moves leftward to eliminate the deviation (to converge $\theta be\_y\_s$ to zero).

If both the actual base body tilt angles $\theta b\_x$ and $\theta b\_y$ deviate from the desired values $\theta b\_x\_obj$ and $\theta b\_y\_obj$, respectively, then the moving operation of the wheel assembly 5 in the fore-and-aft direction to eliminate the deviation of $\theta b\_x$ and the moving operation of the wheel assembly 5 in the lateral direction to eliminate the deviation of $\theta b\_y$ are combined, so that the wheel assembly 5 will move in a direction combining the X-axis direction and the Y-axis direction (a direction at an angle to both the X-axis direction and the Y-axis direction).

Thus, if the posture of the base body 9 tilts from the basic posture, then the wheel assembly 5 moves toward the tilted side. Hence, if, for example, the occupant intentionally inclines his/her upper body in the boarding mode, then the wheel assembly 5 moves to the tilted side.

In the case where the desired center-of-gravity velocities for control $Vb\_x\_mdfd$ and $Vb\_y\_mdfd$ are zero, when the posture of the base body 9 converges to the basic posture, the movement of the wheel assembly 5 substantially comes to a halt. Further, if, for example, the tilt angle $\theta b\_x$ of the base body 9 in the direction about the Y-axis is maintained at a certain angle tilted from the basic posture, then the moving velocity of the wheel assembly 5 in the X-axis direction converges to a certain moving velocity corresponding to the angle (a moving velocity having a certain stead-state deviation from the desired center-of-gravity velocity for control $Vb\_x\_mdfd$). The same applies to the case where the tilt angle $\theta b\_y$ of the base body 9 in the direction about the X-axis is maintained at a certain angle tilted from the basic posture.

Further, in a situation wherein, for example, the required center-of-gravity velocities $Vb\_x\_aim$ and $Vb\_y\_aim$ generated by the required center-of-gravity velocity generator 74 are both zero, if the amount of the tilt of the base body 9 from the basic posture (the base body tilt angle error measured values $\theta be\_x\_s$ and $\theta be\_y\_s$) becomes relatively large, and the moving velocity or velocities of the wheel assembly 5 in one or both of the X-axis direction and the Y-axis direction for eliminating the tilt amount or for maintaining the tilt amount (these moving velocities corresponding to the expected center-of-gravity velocity stead-state error values $Vb\_x\_prd$ and $Vb\_y\_prd$, respectively, shown in FIG. 12) are an excessively large moving velocity or velocities that would cause the rotational angular velocity or velocities of one or both of the electric motors 31R and 31L to deviate from the permissible range or ranges thereof, then a velocity in the opposite direction from the moving velocity of the wheel assembly 5 (specifically, $Vw\_x\_lim2 - Vb\_x\_prd$ and $Vw\_y\_lim2 - Vb\_y\_prd$) will be determined as the desired center-of-gravity velocities for control $Vb\_x\_mdfd$ and $Vb\_y\_mdfd$. Then, the manipulated variable components $u3\_x$ and $u3\_y$ among the manipulated variable components constituting a control input are determined such that the estimated center-of-gravity velocity values $Vb\_x\_s$ and $Vb\_y\_s$ will be converged to the desired center-of-gravity velocities for control $Vb\_x\_mdfd$ and $Vb\_y\_mdfd$, respectively. This prevents the amount of a tilt of the base body 9 from the basic posture from becoming excessively large, thus preventing the rotational angular velocity or velocities of one or both of the electric motors 31R and 31L from becoming excessively high.

Further, in the gain adjustor 78, in the situation wherein one or both of the estimated center-of-gravity velocity values $Vb\_x\_s$ and $Vb\_y\_s$ become large, and the moving velocity or velocities of the wheel assembly 5 in one or both of the X-axis direction and the Y-axis direction required to eliminate the tilt of the base body 9 from the basic posture or to maintain the tilt amount may become an excessively large moving velocity that would cause the rotational angular velocity or velocities of one or both of the electric motors 31R and 31L to deviate from the permissible range or ranges thereof, as the deviation becomes more notable (more specifically, as the absolute values of Vover_x and Vover_y shown in FIG. 10 increase), one or both of the gain adjustment parameters Kr_x and Kr_y are brought closer to 1 from 0.

In this case, each i-th gain coefficient Ki_x (i=1, 2 or 3) calculated according to the expression 09x approaches to the constant value Ki_b_x on the maximum end from the constant value Ki_a_x on the minimum end, as Kr_x approaches to 1. The same applies to each i-th gain coefficient Ki_y (i=1, 2 or 3) calculated according to the expression 09y.

As the absolute values of the gain coefficients increase, the sensitivities of the manipulated variables (the imaginary wheel rotational angular acceleration commands ωwdot_x_cmd and ωwdot_y_cmd) in response to a change in the tilt of the base body 9 increase. Hence, the moment the amount of a tilt of the base body 9 from the basic posture indicates an increase, the moving velocity of the wheel assembly 5 will be controlled to immediately eliminate the tilt amount. This intensely restrains the base body 9 from considerably tilting from the basic posture, thus making it possible to prevent the moving velocity or velocities of the wheel assembly 5 in one or both of the X-axis direction and the Y-axis direction from becoming an excessively high moving velocity that causes the rotational angular velocity or velocities of one or both of the electric motors 31R and 31L to deviate from the permissible range or ranges thereof.

Further, in the moving mode of the autonomous mode, if the required center-of-gravity velocity generator 74 generates the required center-of-gravity velocities Vb_x_aim and Vb_y_aim (required center-of-gravity velocities in which one or both of Vb_x_aim and Vb_y_aim are not zero) according to the operations on the grip 18 by the occupant without boarding the seat 3, then the required center-of-gravity velocities Vb_x_aim and Vb_y_aim are determined as the desired center-of-gravity velocities for control Vb_x_mdfd and Vb_y_mdfd, respectively, unless the rotational angular velocity or velocities of one or both of the electric motors 31R and 31L become a high rotational angular velocity or velocities that deviate from the permissible range or ranges thereof (specifically, as long as Vw_x_lim2 and Vw_y_lim2 shown in FIG. 12 agree with Vb_x_t and Vb_y_t, respectively). Thus, the moving velocity of the wheel assembly 5 is controlled such that the required center-of-gravity velocities Vb_x_aim and Vb_y_aim are implemented (such that the actual center-of-gravity velocities approach to the required center-of-gravity velocities Vb_x_aim and Vb_y_aim).

The process by the required center-of-gravity velocity generator 74, the description of which has been deferred, will now be described in detail.

In the present embodiment, if the operation mode of the vehicle 1 is the boarding mode, then the required center-of-gravity velocity generator 74 sets the required center-of-gravity velocities Vb_x_aim and Vb_y_aim to zero, as described above.

Meanwhile, in the case where the operation mode of the vehicle 1 is the autonomous mode, the required center-of-gravity velocity generator 74 determines the required center-of-gravity velocities Vb_x_aim and Vb_y_aim variably according to whether the operation mode is the moving mode according to the operations of the grip 18 or the operation mode is the halting mode where the vehicle 1 is maintained in the halt state.

Figure 14:
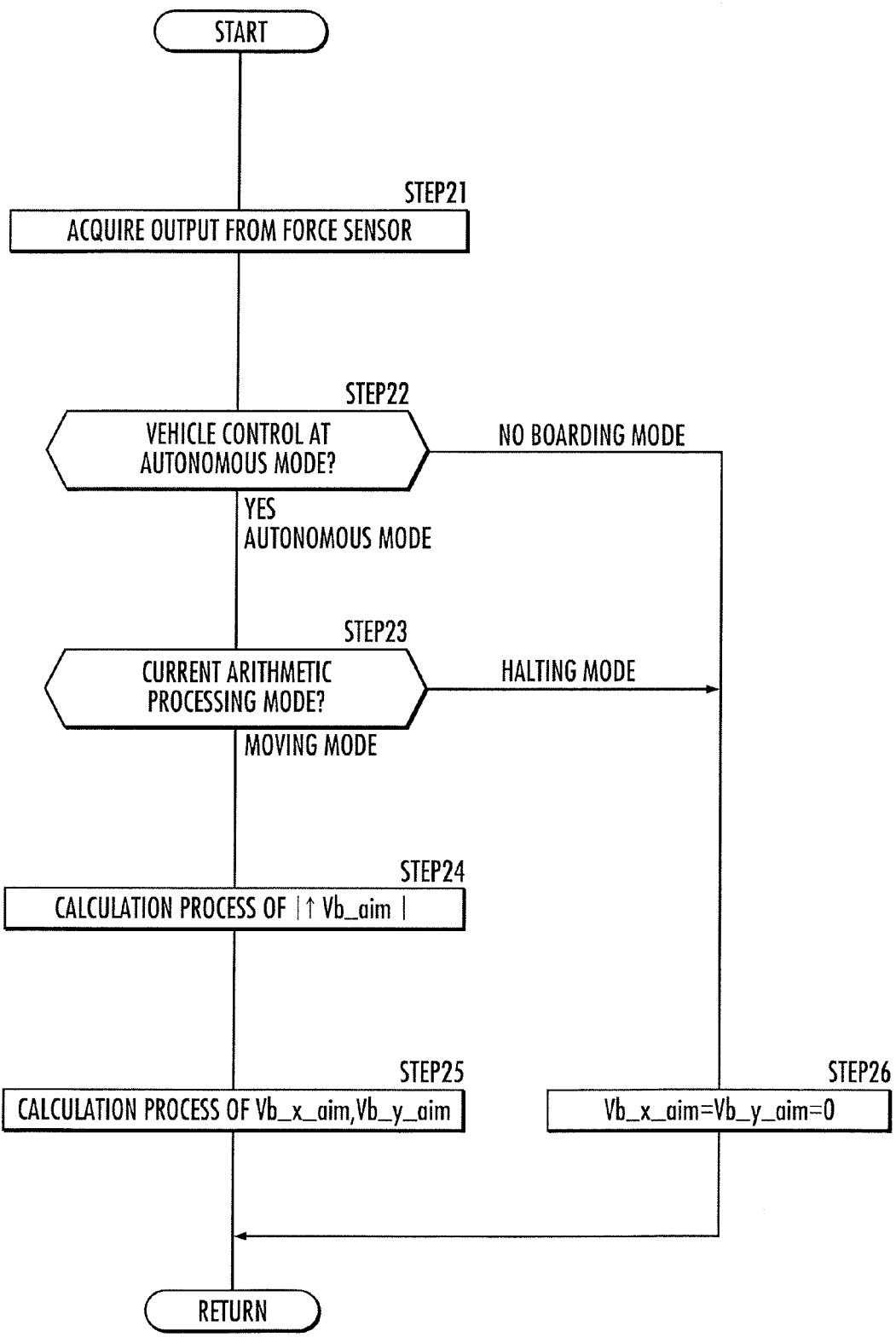
FIG. 14 is a flowchart illustrating a process performed by a required center-of-gravity velocity generator 74 illustrated in FIG. 9.

Specifically, the required center-of-gravity velocity generator 74 performs the process illustrated in the flow chart of FIG. 14 sequentially in a predefined control processing cycle to determine the required center-of-gravity velocity Vb_x_aim in the X axial direction and the required center-of-gravity velocity Vb_y_aim in the Y axial direction in the autonomous mode.

As to be described hereinafter, first, the required center-of-gravity velocity generator 74 performs the process of STEP 21. In the process, the required center-of-gravity velocity generator 74 acquires the output from the force sensor 55.

The output from the force sensor 55 includes two components: the X-axis direction component and the Y-axis direction component. The required center-of-gravity velocity generator 74 acquires the measured value of the X-axis direction component Fx and the measured value of the Y-axis direction component Fy in the grip-acting external force F acting on the grip 18.

Thereafter, proceeding to STEP 22, the required center-of-gravity velocity generator 74 determines whether or not the operation mode of the vehicle 1 is in the autonomous mode. The determination is performed on the basis of the determination result in STEP 4 of FIG. 7.

If the operation mode of the vehicle 1 is not in the autonomous mode in STEP 22, in other words, in the boarding mode, the required center-of-gravity velocity generator 74 proceeds to STEP 26 to determine both the required center-of-gravity velocities Vb_x_aim and Vb_y_aim to zero.

On the other hand, if the operation mode of the vehicle 1 is in the autonomous mode in STEP 22, the required center-of-gravity velocity generator 74 proceeds to STEP 23 to determine whether the current arithmetic processing mode is the moving mode or the halting mode.

A variety of elements may be considered as elements to determine the arithmetic processing mode. In the present embodiment, for example, the current arithmetic processing mode is determined according to the magnitude of the grip-acting external force F denoted by the output from the force sensor 55 acquired in STEP 21. Specifically, when the occupant is not aboard the vehicle 1, if the magnitude of the grip-acting external force F denoted by the output from the force sensor 55 is equal to or greater than a predefined threshold, then the current arithmetic processing mode is determined to be the moving mode; if the magnitude of the grip-acting external force F denoted by the output from the force sensor 55 is smaller than the predefined threshold, then the current arithmetic processing mode is determined to be the halting mode. The predefined threshold is set so as to determine whether or not the magnitude of the grip-acting external force F is zero or a minute value (close to zero).

In place of determining the arithmetic processing mode as described above, it is also acceptable, for example, to dispose a changing-over switch for switching the moving mode and the halting mode in a predefined location of the vehicle 1 so as to determine the current arithmetic processing mode according to an output from the changing-over switch. Specifically, when the output of the changing-over switch is in an output state denoting the selection of the moving mode, the current arithmetic processing mode is determined to be in the moving mode; when the output of the changing-over switch is in an output state denoting the selection of the halting mode, it is determined to be in the halting mode. Furthermore, it is also acceptable to use a plurality of combinations of the mentioned plural determination elements to determine whether the arithmetic processing mode is in the moving mode or the halting mode.

If the current arithmetic processing mode is determined to be in the halting mode, the required center-of-gravity velocity generator 74 proceeds to STEP 26 to set both the required center-of-gravity velocities Vb_x_aim and Vb_y_aim to zero.

On the other hand, if the current arithmetic processing mode is determined to be in the moving mode, the required center-of-gravity velocity generator 74 proceeds to STEP 24 to calculate a magnitude $|\uparrow Vb\_aim|$ (=sqrt($Vb\_x\_aim^2$+ $Vb\_y\_aim^2$)) of a required center-of-gravity velocity vector $\uparrow Vb\_aim$ (velocity vector having two components of the required center-of-gravity velocities Vb_x_aim and Vb_y_aim) according to the output acquired from the force sensor 55, namely the grip-acting external force F acting on the grip 18.

Figure 15:
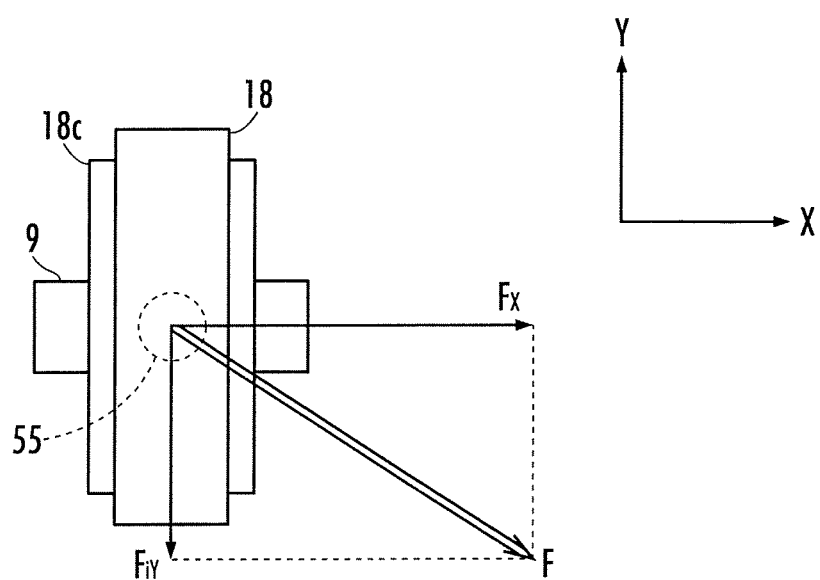
FIG. 15 is a diagram illustrating results of a calculation process of |↑Vb_aim| and a calculation process of Vb_x_aim and Vb_y_aim illustrated in FIG. 14.

Specifically, as illustrated in FIG. 15, the required center-of-gravity velocity generator 74 calculates the magnitude of the grip-acting external force F (=sqrt($Fx^2+Fy^2$) from the measured values Fx and Fy in the X-axis direction and Y-axis direction, respectively, by the force sensor 55.

The grip-acting external force F has the magnitude of the force applied by the pedestrian (an occupant not boarding the seat 3) or the like on the grip 18 so as to move the vehicle 1, therefore, the magnitude thereof is in relation to the velocity of the vehicle intended to be moved. In other words, it has been considered to reflect the intention of the occupant to move the vehicle 1 faster when the force is greater or slower when the force is smaller.

The required center-of-gravity velocity generator 74 calculates the magnitude $|\uparrow Vb\_aim|$ of the required center-of-gravity velocity vector $\uparrow Vb\_aim$ according to the calculated grip-acting external force F.

$$|\uparrow Vb\_aim|=K \cdot F \qquad \text{Expression 11}$$

In the expression 11, K is a gain coefficient, a fixed value preliminarily set.

However, in the determination of the magnitude $|\uparrow Vb\_aim|$ of the required center-of-gravity velocity vector, if the grip-acting external force F (=sqrt ($F\_x^2+F\_y^2$)) is equal to or smaller than the lower limit of the predefined threshold, it is acceptable for the required center-of-gravity velocity generator 74 to determine the magnitude $|\uparrow Vb\_aim|$ of the required center-of-gravity velocity vector to zero, regardless of the expression 11.

The reason thereof is that if the magnitude of the grip-acting external force F is equal to or smaller than a predefined value, the detection value of the force sensor 55 will lack reliability. For example, if the detection value of the force sensor 55 contains certain noises caused by movements such as the shaking or the like of the base body 9 and the magnitude of the grip-acting external force F detected by the force sensor 55 is equal to or smaller than the predefined value, it would be difficult to move the vehicle 1 as desired due to the affection from the noises. Thereby, when the magnitude of the grip-acting external force F is equal to or smaller than the lower limit of the predefined threshold, by determining the magnitude $|\uparrow Vb\_aim|$ of the required center-of-gravity velocity vector to zero, the vehicle 1 is stopped as a result thereof.

Thereafter, the required center-of-gravity velocity generator 74 proceeds to STEP 25 to calculate the required center-of-gravity velocities Vb_x_aim and Vb_y_aim by using the measured values Fx and Fy of the two horizontal components of the output acquired from the force sensor 55 in STEP 21.

Since the action direction of the grip-acting external force F with respect to the vehicle 1 in the horizontal plane coincides with the direction toward which the pedestrian or the like intends to move the vehicle 1, as illustrated in FIG. 15, the required center-of-gravity velocity generator 74 calculates the required center-of-gravity velocities Vb_x_aim and Vb_y_aim in such a way that a ratio between the X-axis direction component Fx and the Y-axis direction component Fy of the grip-acting external force F coincides with a ratio between the required center-of-gravity velocity Vb_x_aim in the X-axis direction and the required center-of-gravity velocity Vb_y_aim in the Y-axis direction.

Specifically, the required center-of-gravity velocity generator 74 determines the required center-of-gravity velocities Vb_x_aim and Vb_y_aim according to the following expression.

$$Vb\_x\_aim=|\uparrow Vb\_aim| \cdot (Fx/F)=K \cdot Fx \qquad \text{Expression 13x}$$

$$Vb\_y\_aim=|\uparrow Vb\_aim| \cdot (Fy/F)=K \cdot Fy \qquad \text{Expression 13y}$$

The expressions 13x and 13y are simplified by introducing the above expression 11 to the right side thereof.

By using the required center-of-gravity velocities Vb_x_aim and Vb_y_aim calculated in the above, the posture control calculator 80 determines the imaginary wheel rotational angular acceleration commands ωwdot_xy_cmd as mentioned afore. According thereto, it is possible to move the vehicle 1 according to the grip-acting external force F applied by the pedestrian or the like on the grip 18 at the travelling velocity of the vehicle 1 related to the magnitude of the force and the travelling direction of the vehicle 1 corresponding to the orientation of the force.

Therefore, when the pedestrian or the like is moving the vehicle 1 by holding and tilting the seat 3 or the base body 9, it is unnecessary to maintain the seat 3 or the base body 9 at a tilted state toward the travelling direction; it is possible for the pedestrian or the like to move the vehicle 1 by applying the external force F on the grip 18 while the base body tilt angle θb_xy is being maintained at the desired value θb_xy_obj for the autonomous mode and to improve the stability of the travelling velocity of the vehicle. Thereby, the pedestrian or the like can move the vehicle 1 smoothly as intended.

Here, the correspondence relationship between the vehicle 1 of the embodiment described above and the present invention will be supplementally described.

The process performed by the controller 50 in STEP 9 and STEP 10 of FIG. 7 embodies the travelling motion unit controller of the present invention. The imaginary wheel rotational angular acceleration commands ωwdot_x_cmd and ωwdot_y_cmd correspond to the manipulated variables for control of the present invention, respectively. The desired center-of-gravity velocities for control Vb_x_mdfd and Vb_y_mdfd correspond to the desired velocity of the present invention. The required center-of-gravity velocities Vb_x_aim and Vb_y_aim correspond to a value based on the external force detected by the external force detector. The desired value θb_xy_obj of the base body tilt angle θb_xy corresponds to the desired tilt angle of the present invention.

Some modifications related to the embodiment described above will now be described.

In the above-mentioned embodiment, it is described that the vehicle system center-of-gravity point (more accurately, the overall vehicle-occupant center-of-gravity point) is a predefined representative point of the vehicle 1; however, it is acceptable to set the predefined representative point as the central point of the wheel assembly 5, a point in a predefined portion (for example the support frame 13) of the base body 9 or the like.

In the above-mentioned embodiment, the occupant which is a pedestrian not aboard the seat 3 is described as an example of the mobile object; however, it is not limited thereto, in addition to a pedestrian, a mobile object such as another vehicle or the like except the present vehicle 1 may be configured to control the movement of the vehicle 1 according to the grip-acting external force F acting on the grip 18.

In the embodiment mentioned above, the required center-of-gravity velocity generator 74 is configured to calculate the required center-of-gravity velocities Vb_x_aim and Vb_y_aim related to the external force F acting on the grip 18 in both the X-axis direction and the Y-axis direction, and the posture control calculator 80 is configured to determined the imaginary wheel rotational angular acceleration commands ωwdot_x_cmd and ωwdot_y_cmd; however, it is not limited thereto.

For example, it is acceptable to calculate the required center-of-gravity velocity Vb_x_aim or the required center-of-gravity velocity Vb_y_aim only in one direction of the X-axis direction or the Y-axis direction by the required center-of-gravity velocity generator 74 and to determine the imaginary wheel rotational angular acceleration commands ωwdot_x_cmd and ωwdot_y_cmd by the posture control calculator 80.

For example, in the present embodiment, the grip 18 is configured to extend in the lateral direction so as to enable the pedestrian or the like to move the vehicle 1 in the fore-and-aft direction (assuming that the pedestrian or the like in the front of the vehicle 1 holds the grip 18 to advance the vehicle to the front). Therefore, it is acceptable to calculate the required center-of-gravity velocity Vb_x_aim based on the grip-acting external force F according to the above expression 13 only in the X-axis direction and set the required center-of-gravity velocity Vb_x_aim to zero in the Y-axis direction. Since in view of the fact that the desired moving direction by the pedestrian or the like is generally one specific direction (for example, in the X-axis direction which is the fore-and-aft direction), it is considered that it is acceptable to reflect the external force acting on the grip 18 at least in one axial direction. Since the vehicle 1 is controlled with the travelling velocity thereof in the Y-axis direction to be zero, the side shaking of the vehicle 1 in the Y-axis direction is avoided, enabling the pedestrian or the like to move the vehicle 1 smoothly.

Further, in place of calculating the required center-of-gravity velocity Vb_x_aim or the Vb_y_aim based on the grip-acting external force F in one predefined direction (for example, the X-axis direction), it is acceptable to compare the force magnitude of the X-axis direction component Fx and the magnitude of the Y-axis direction component Fy of the grip-acting external force F, calculate the required center-of-gravity velocity Vb_x_aim or Vb_y_aim based on the grip-acting external force F in the direction where the force magnitude is greater, and set the required center-of-gravity velocity Vb_x_aim or Vb_y_aim to zero in the direction where the force magnitude is smaller. According thereto, it is possible to reflect the grip-acting external force F acting on the grip 18 in one direction to which the pedestrian or the like is intended to move the vehicle 1 regardless of how the grip is assembled.

In the embodiments mentioned above, the vehicle 1 having the configuration illustrated in FIG. 1 and FIG. 2 is exemplified; however, the inverted pendulum type vehicle 1 according to the present invention is not limited to the vehicle exemplified. For example, the wheel assembly 5 serving as the traveling motion unit of the vehicle 1 in the present embodiment has the one-piece construction; however, it is acceptable that the wheel assembly 5 may have a construction shown in, for example, FIG. 10 of the Patent Document 3. Specifically, the wheel assembly may be constructed to have a rigid annular shaft member and a plurality of rollers rotatively and externally inserted into the rigid annular shaft member such that the axial centers thereof are oriented in the tangential direction of the shaft member, the plurality of these rollers being arranged in the circumferential direction along the shaft member.

It is acceptable that the traveling motion unit may have a crawler-shaped structure, as shown in, for example, FIG. 3 of the Patent Document 2.

Figure 5:
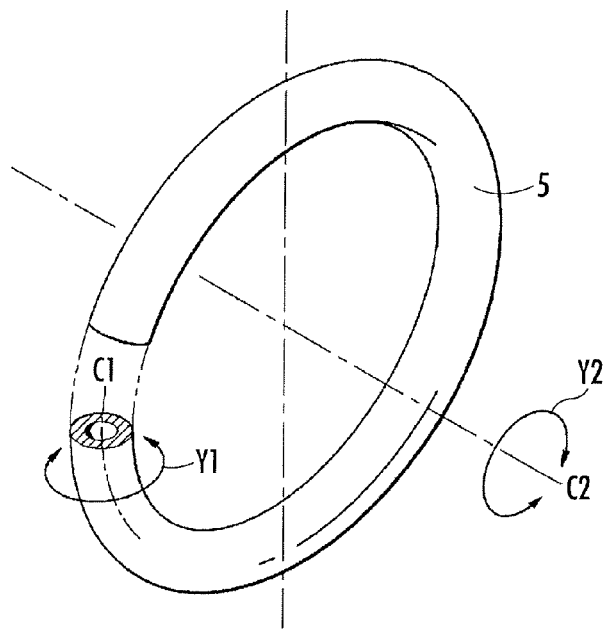
FIG. 5 is a perspective view of a traveling motion unit (wheel assembly) of the inverted pendulum type vehicle according to the embodiment.

Alternatively, as shown in, for example, FIG. 5 of the Patent Document 2, FIG. 7 of the Patent Document 3, or FIG. 1 of the Patent Document 1, the traveling motion unit may be constructed of a spherical member, and the vehicle may be constructed such that the spherical member is rotatively driven in a direction about the X-axis and a direction about the Y-axis by an actuator (e.g., an actuator having the aforesaid wheel assembly 5).

Further, in the present embodiment, the vehicle 1 provided with the seat 3 as the boarding section for an occupant has been exemplified. Alternatively, however, the inverted pendulum type vehicle according to the present invention may be a vehicle having a construction wherein a step on which an occupant rests his/her both feet and a section to be gripped by the occupant standing on the step are mounted on a base body, as illustrated in, for example, FIG. 8 in Patent Document 3.

Thus, the present invention can be applied to inverted pendulum type vehicles of various constructions, as illustrated in the aforesaid patent documents 1 to 3 and the like.

Further, the inverted pendulum type vehicle according to the present invention may be configured to have a plurality of traveling motion units capable of moving on a floor surface in all directions (e.g., two in the lateral direction, or two in the fore-and-aft direction, or three or more).

Further, in the inverted pendulum type vehicle according to the present invention, it is not essential for the base body to tilt together with the payload supporting part for the occupant. For example, in the case where the vehicle includes a plurality of the traveling motion units, it is acceptable that the base body to which the traveling motion units are assembled is configured not to tilt with respect to the floor surface and the payload supporting is assembled to the base body freely tiltable with respect to the base body.

DESCRIPTION OF REFERENCE NUMERALS

1: inverted pendulum type omnidirectional vehicle; 3: seat (payload supporting part); 4: engagement member; 5: wheel assembly (traveling motion unit); 7: actuator; 9: base body; 50: control unit (travelling motion unit controller); 55: force sensor (external force detector); 74: required center-of-gravity velocity generator (travelling motion unit controller).

What is claimed is:

1. A control device of an inverted pendulum type vehicle having a travelling motion unit capable of moving on a floor surface, an actuator for driving the travelling motion unit, a base body assembled with the travelling motion unit and the actuator, and a payload supporting part for an occupant assembled to the base body, comprising:

a tilt angle measuring element configured to generate an output according to an actual tilt angle of the base body;

an external force detector configured to detect an external force acting on a holding member disposed in the base body; and a travelling motion unit controller configured to determine a manipulated variable for control which is configured to define a driving power to be applied to the travelling motion unit according to the external force detected by the external force detector while performing a control process to maintain a measured value of the tilt angle of the base body at a desired tilt angle of a predefined value, and to control the travelling motion of the travelling motion unit via the actuator according to the determined manipulated variable for control, wherein the control device is further provided with a representative point velocity measuring element configured to generate an output according to a representative point velocity which is an actual travelling velocity of a predefined representative point of the vehicle, for a first direction and a second direction orthogonal to each other on the floor surface, the travelling motion unit controller determines the manipulated variable for control so as to make both a first velocity deviation component for a first direction and a second velocity deviation component for a second direction to zero, the first velocity deviation component being a deviation between a velocity component in the first direction of the representative point velocity denoted by the output of the representative point velocity measuring element and a desired velocity in the first direction determined according to a force component in the first direction of the external force detected by the external force detector, and the second velocity deviation component being a deviation between a velocity component in the second direction of the representative point velocity denoted by the output of the representative point velocity measuring element and a desired velocity in the second direction determined according to a force component in the second direction of the external force detected by the external force detector.

2. A control device of an inverted pendulum type vehicle having a travelling motion unit capable of moving on a floor surface, an actuator for driving the travelling motion unit, a base body assembled with the travelling motion unit and the actuator, and a payload supporting part for an occupant assembled to the base body, comprising:

a tilt angle measuring element configured to generate an output according to an actual tilt angle of the base body;

an external force detector configured to detect an external force acting on a holding member disposed in the base body; and a travelling motion unit controller configured to determine a manipulated variable for control which is configured to define a driving power to be applied to the travelling motion unit according to the external force detected by the external force detector while performing a control process to maintain a measured value of the tilt angle of the base body at a desired tilt angle of a predefined value, and to control the travelling motion of the travelling motion unit via the actuator according to the determined manipulated variable for control, wherein the control device is further provided with a representative point velocity measuring element configured to generate an output according to a representative point velocity which is an actual travelling velocity of a predefined representative point of the vehicle, for a first direction and a second direction orthogonal to each other on the floor surface, the travelling motion unit controller determines the manipulated variable for control so as to make both a first velocity deviation component for a first direction and a second velocity deviation component for a second direction to zero, the first velocity deviation component being a deviation between a velocity component in the first direction of the representative point velocity denoted by the output of the representative point velocity measuring element and a desired velocity in the first direction determined according to a force component in the first direction of the external force detected by the external force detector, and the second velocity deviation component being a deviation between a velocity component in the second direction of the representative point velocity denoted by the output of the representative point velocity measuring element and a desired velocity, which is zero, in the second direction.

* * * * *